March 31, 1942.  R. W. PITMAN  2,278,118
BUSINESS MACHINE
Filed Sept. 24, 1936   10 Sheets-Sheet 1

INVENTOR
Richard W. Pitman
BY
ATTORNEY

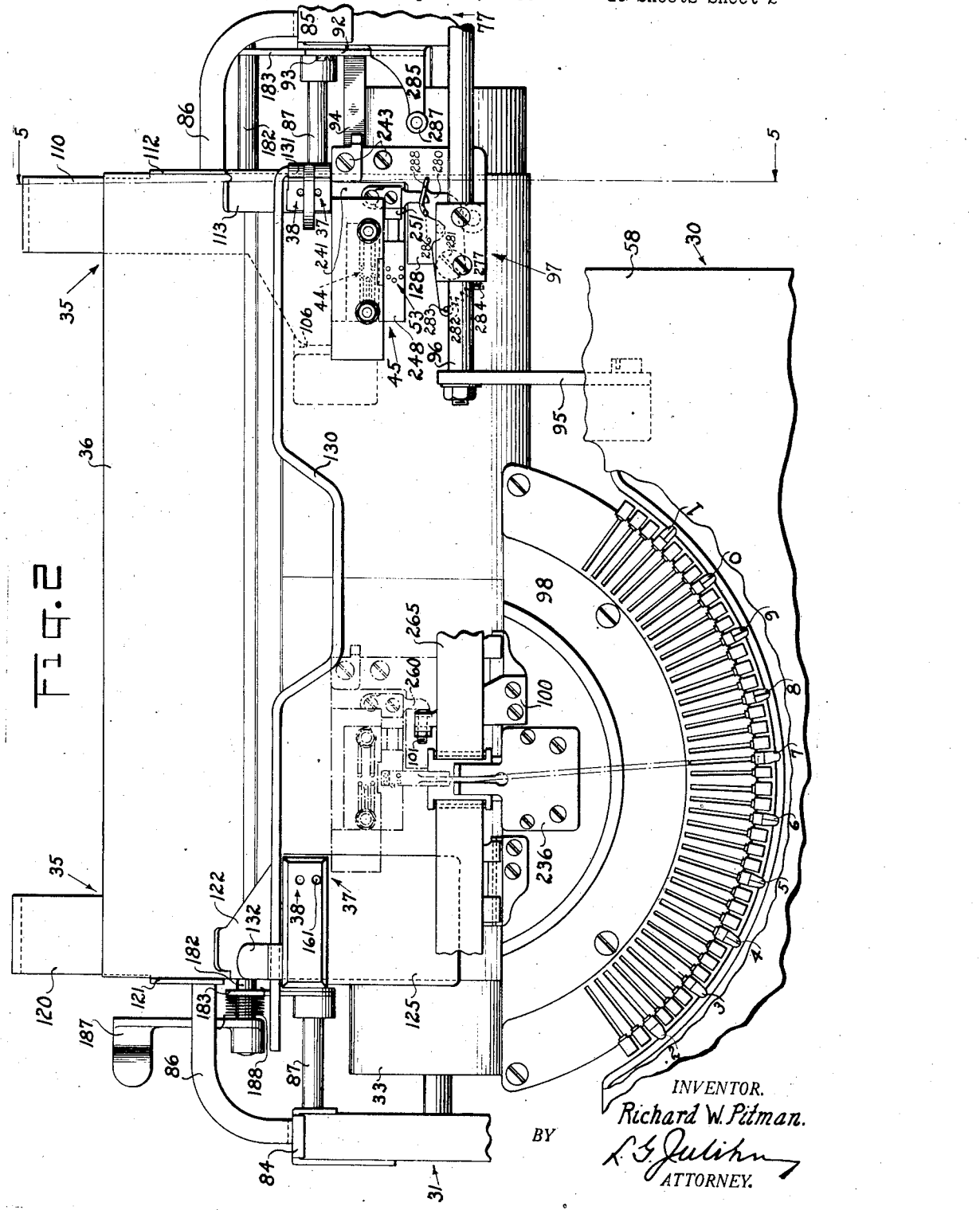

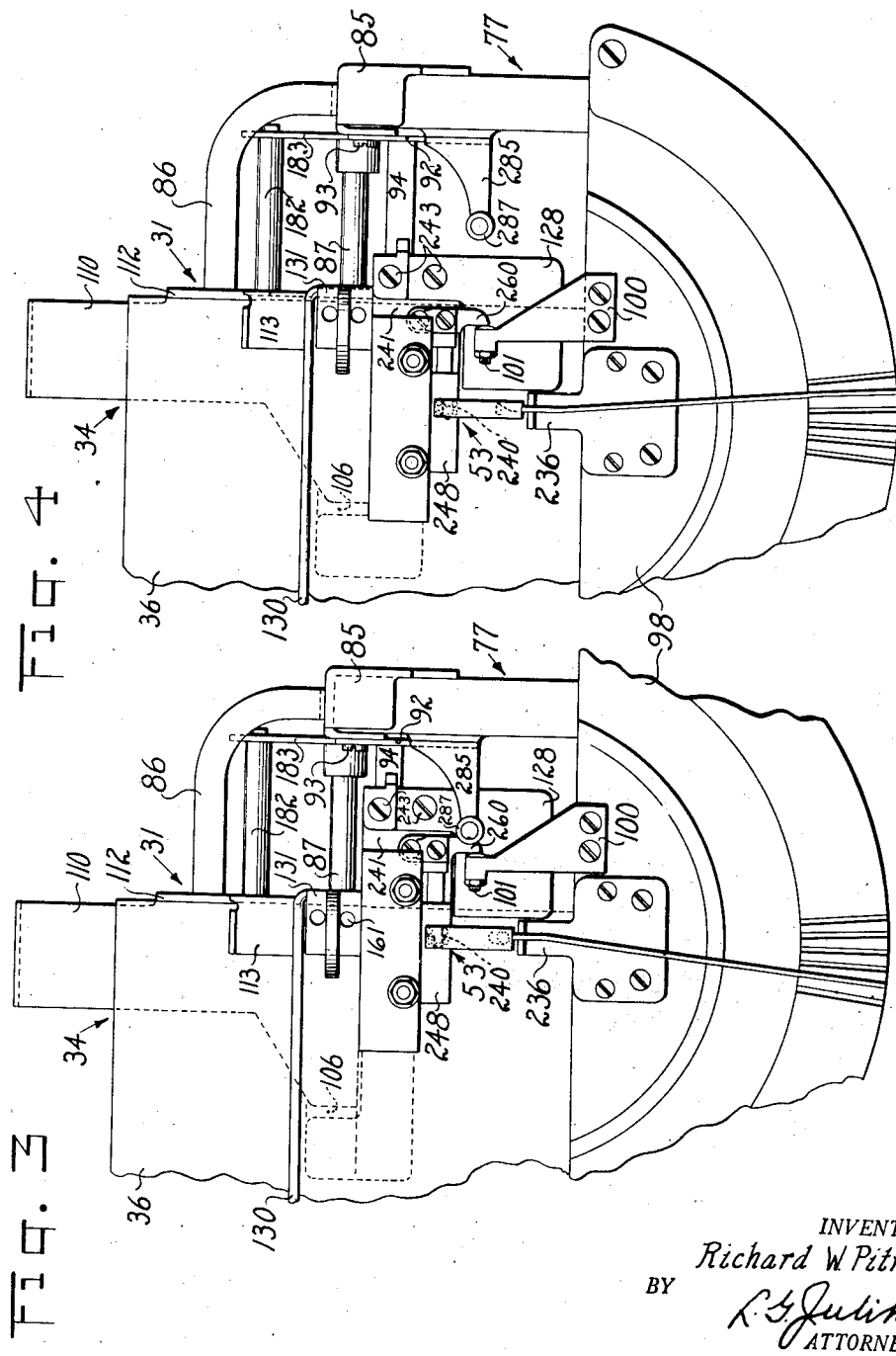

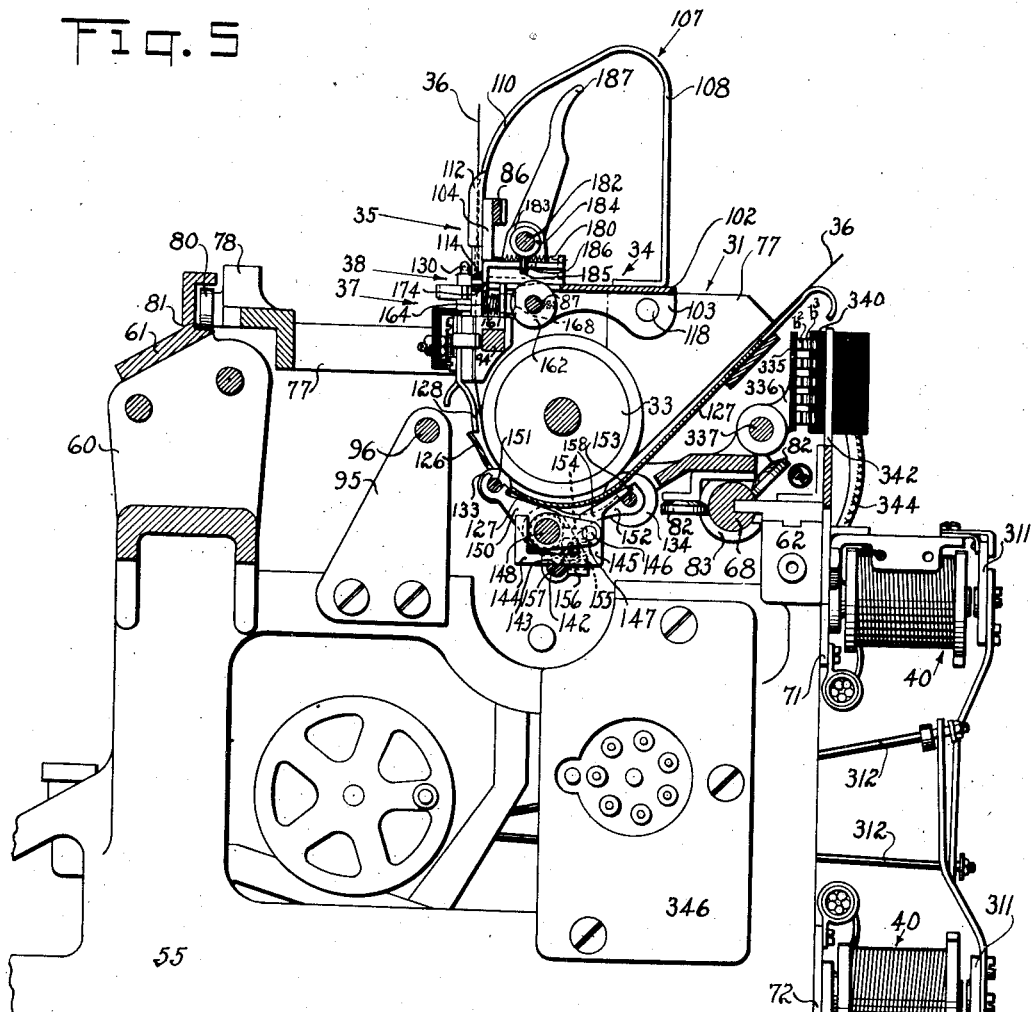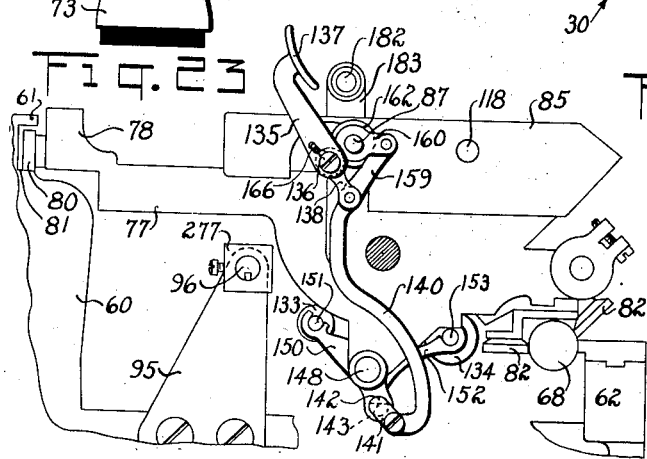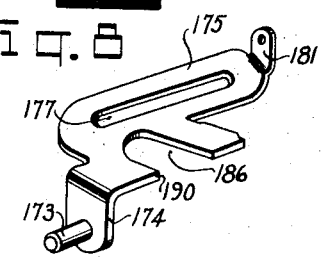

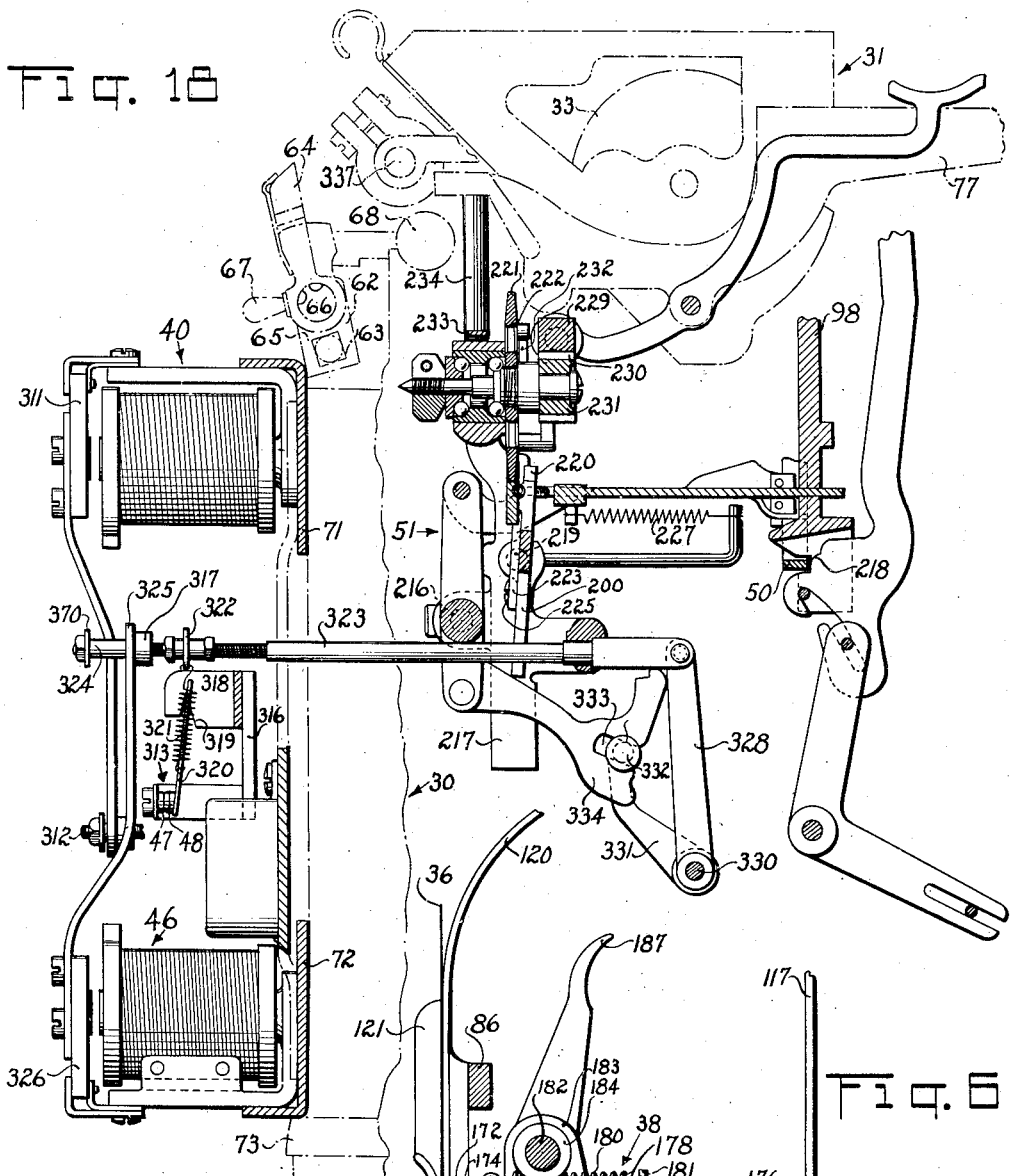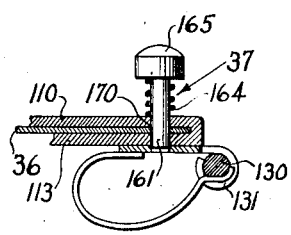

March 31, 1942.　　　R. W. PITMAN　　　2,278,118
BUSINESS MACHINE
Filed Sept. 24, 1936　　　10 Sheets-Sheet 6
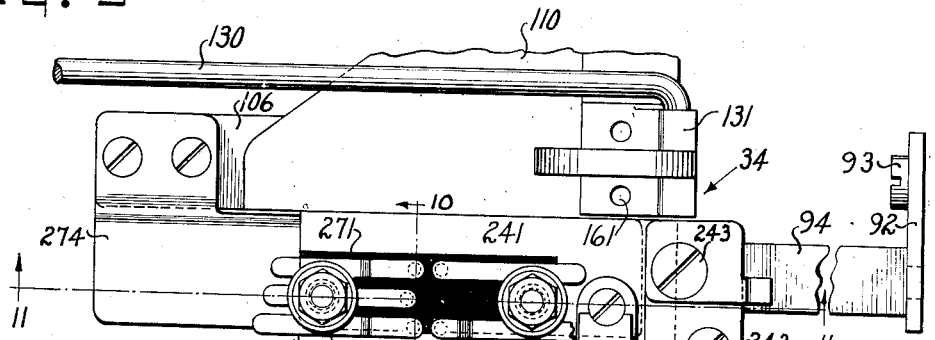
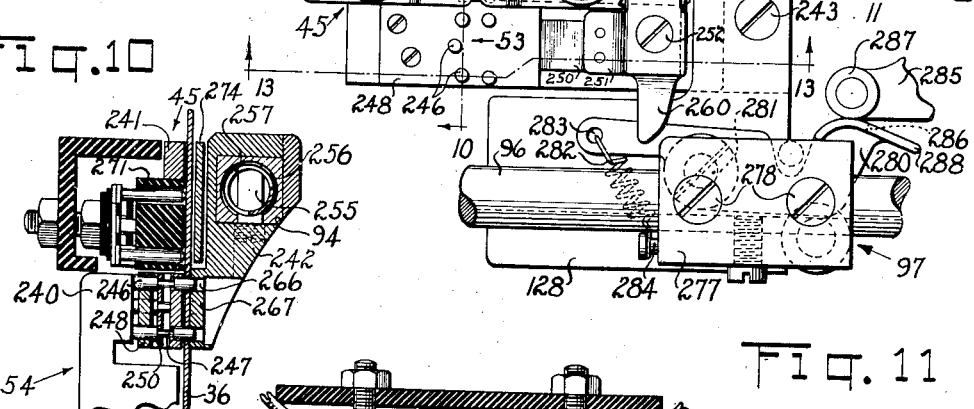
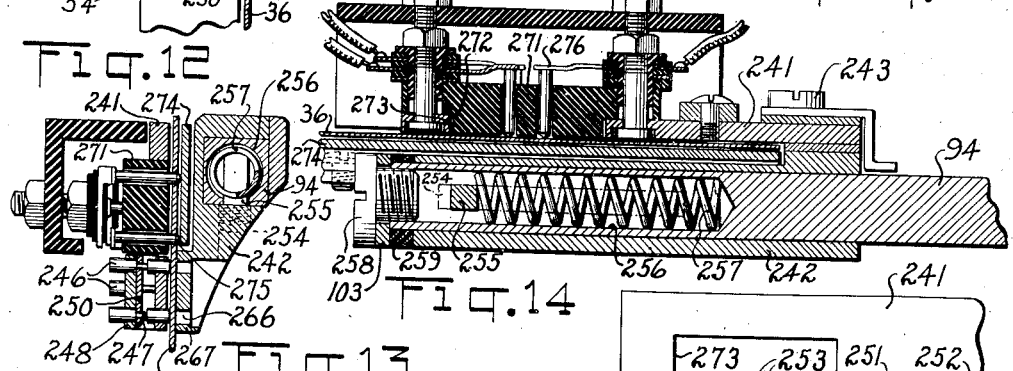
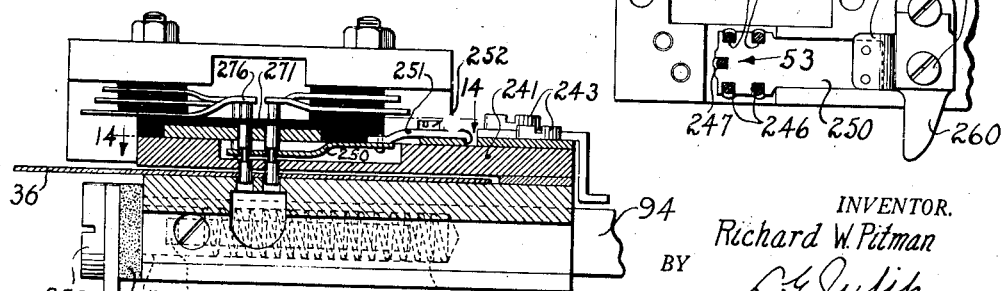
INVENTOR.
Richard W. Pitman
BY
ATTORNEY.

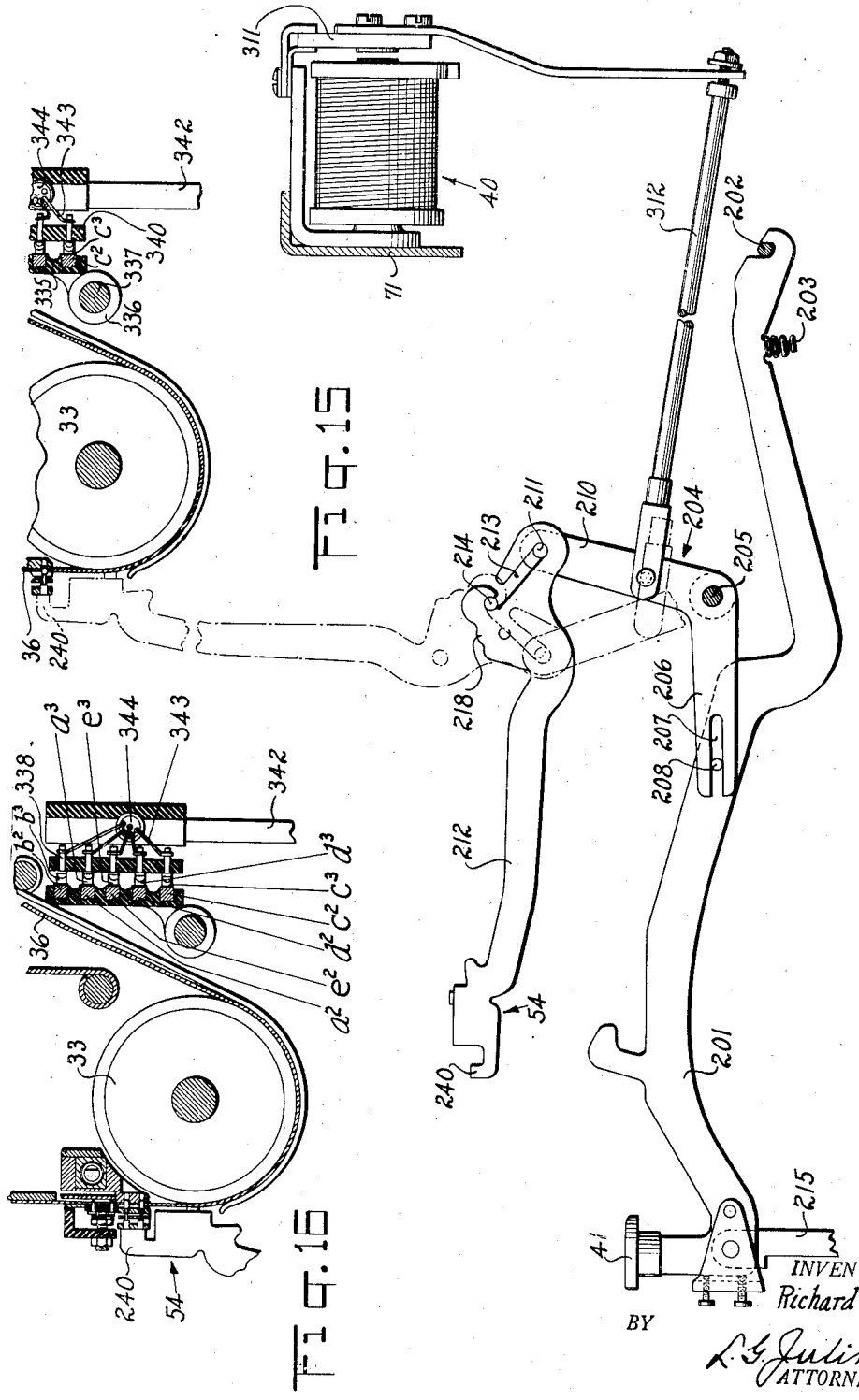

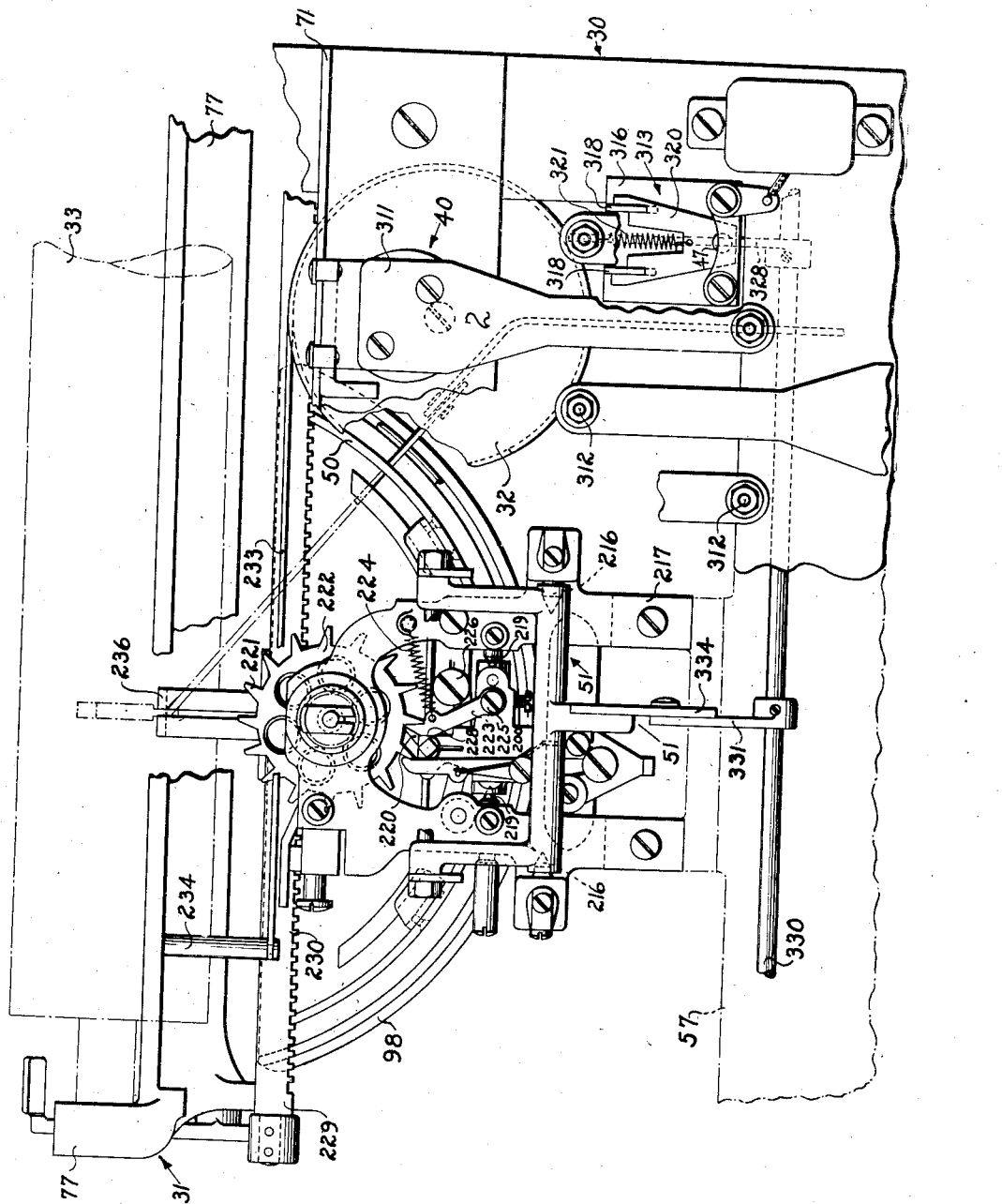

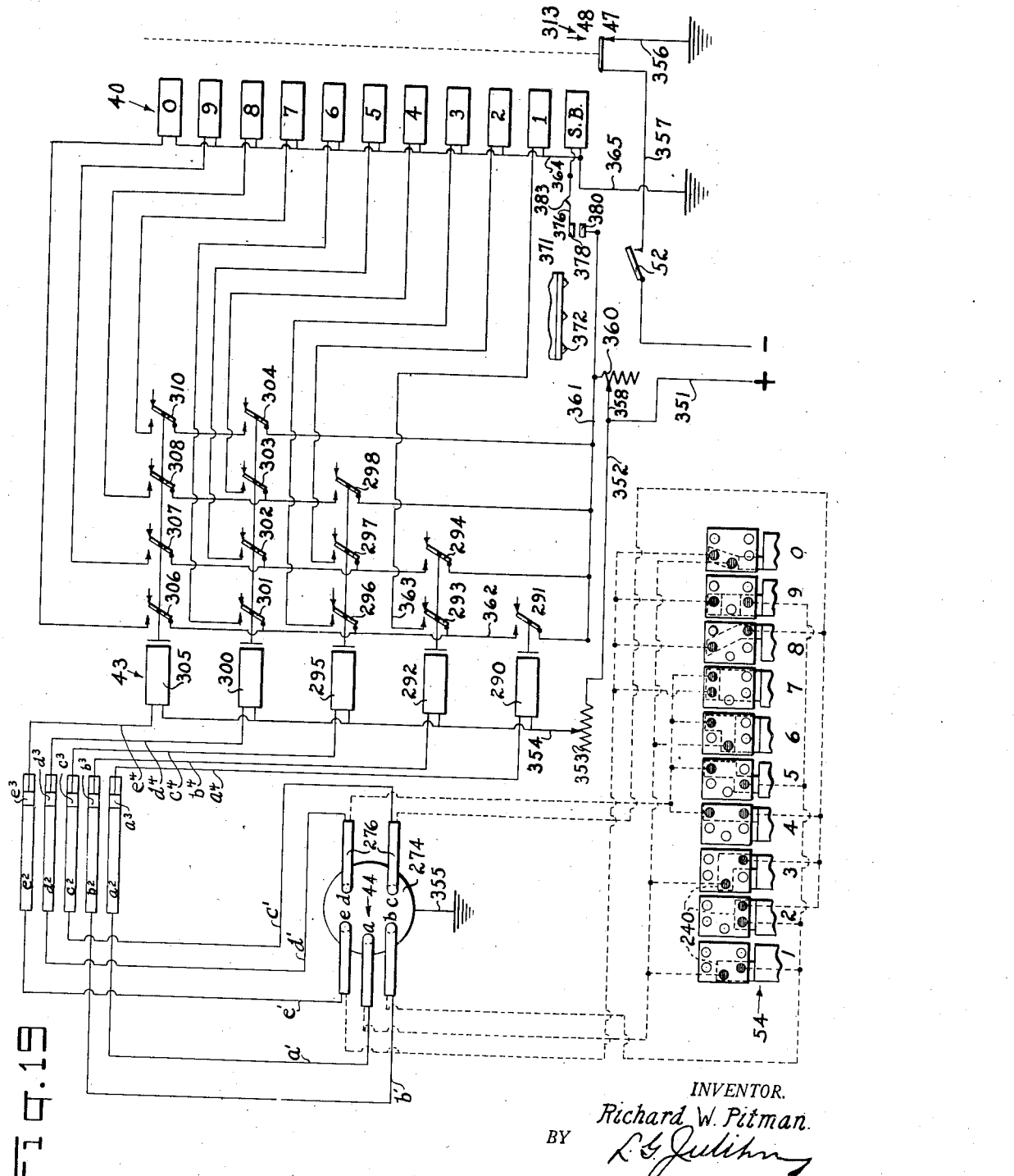

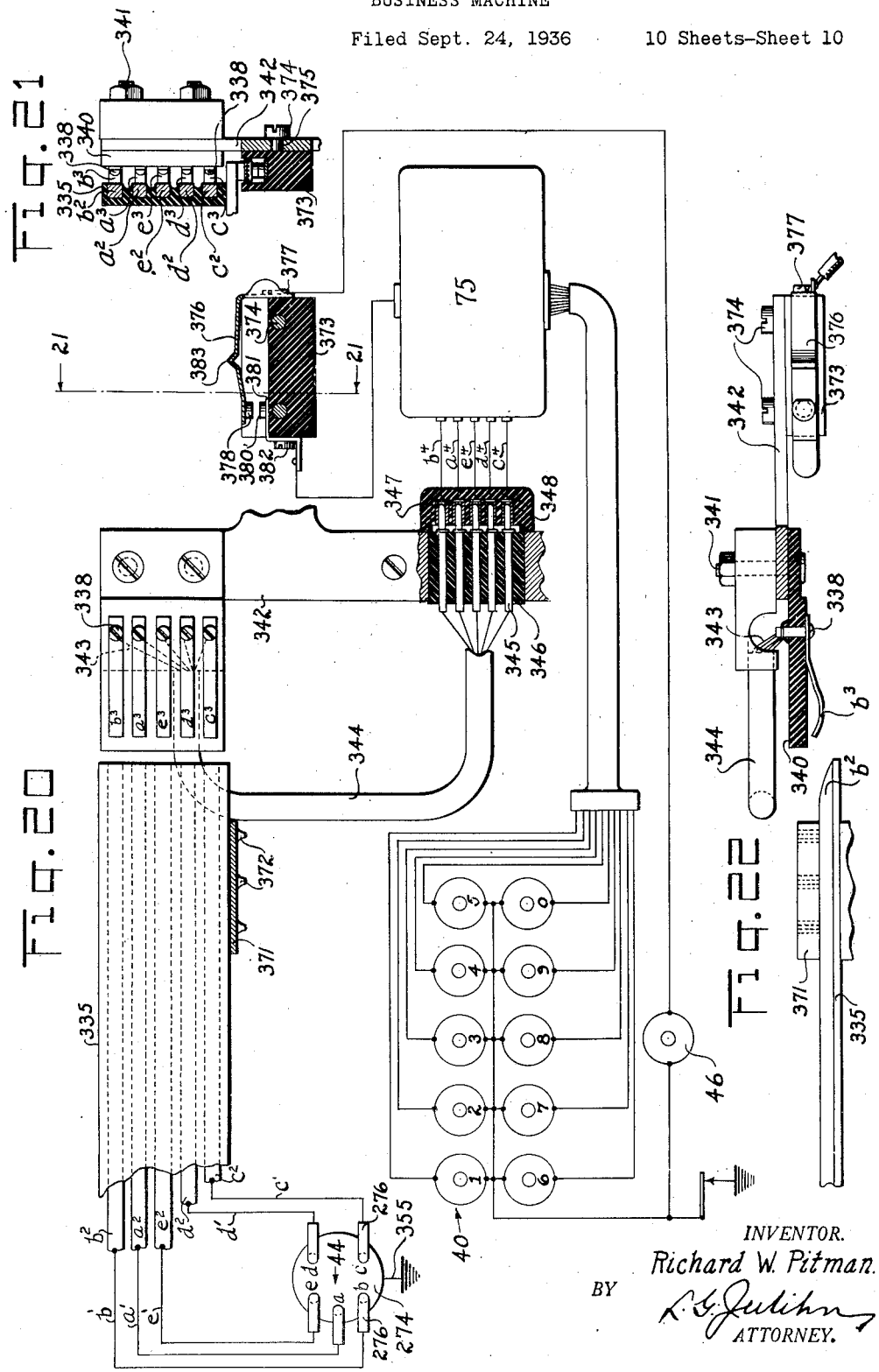

Patented Mar. 31, 1942

2,278,118

UNITED STATES PATENT OFFICE 2,278,118

BUSINESS MACHINE

Richard W. Pitman, New York, N. Y., assignor to Underwood Elliott Fisher Company, a corporation of Delaware Application September 24, 1936, Serial No. 102,389

35 Claims. (Cl. 197—20)

This invention relates to business machines and more particularly to typewriting units usable as such or in connection with computing mechanism. It has special application to combined typewriting and computing machines of the well-known Underwood-Hanson type, such as are exemplified generally by the U. S. patents to Hanson 905,421 and Hart 1,270,411.

It is an object of the present invention to provide, in a typewriting unit which may be coupled with any of a number of different forms of computing or register mechanisms, effective means by which data originally typed on a work sheet may be automatically reproduced at another place on the sheet, when the sheet is relocated in the machine either by manipulation of the sheet or of a carriage therefor.

The invention, when applied to a bookkeeping machine, is adapted to pick up previous balances on a ledger sheet and reproduce them quickly and accurately in the "Old balance" column of the sheet, which reproduction operation may obviously be utilized to enter the amount of the balance in one or more of the registers in the computing mechanism of such machine.

A basic object of the invention is to eliminate the human element as a factor of error in the reproduction of data at another place on a work sheet and substitute machine precision in the reproduction operation, irrespective of whether computations are made in writing and subsequently typed or made mechanically in the manner exemplified by the patents above recited, or in any other manner. Not only is accurate reproduction insured, but the speed of the operation is increased and the operator effort is, of course, greatly reduced.

In general the machine in a preferred form embodies a motor-driven carriage movable step-by-step in letter or numeral spacing direction, and selectively operable types. Means are provided to receive a work sheet in position to be typed upon. The present invention involves the addition to the aforesaid conventional assembly of means for making on the sheet in a given column or zone a plurality of analyzable or readable character sets or codal representations, each of which is symbolic of a particular type impression, and means whereby, when the sheet is relocated in the same machine, a sensing or reading device is or may be rendered operative to control type-actuating devices and thereby cause the reproduction on said sheet automatically and in corresponding order of characters previously typed in said column or zone. Thus, in connection with ledger sheet entries, a "New balance" may be typed in a designated column at the right of the sheet and the sheet removed and thereafter replaced in definite relation to the sensing device which controls means operative in conjunction with the carriage drive and escapement so that what was formerly the "New balance" is automatically typed as an "Old balance" in another column of the sheet.

The invention, viewed in its broader aspects, is not limited to any particular form or style of typewriter or computing machine and although in the preferred form shown in the accompanying drawings it involves the perforating of the sheet and the reading or sensing of the sheet at the perforations by electrical contacts, it will be apparent that other sensing devices are capable of use with the perforations or other similarly functioning codal representations on the work sheet. Particularly in this connection radiant energy is conceivably usable.

Where, as in the preferred form shown and described herein, electrical contacts are employed to sense the character represented by the perforations it is important that good contact be insured, and further that arcing be avoided as the contacts break, in order that the paper work-sheet does not become charred and also in order to preserve the original shape and regularity of the contact points. It is an aim of the present invention to provide means which shall protect the paper and the contact points against the ravages of sparking or arcing as the contacts are disengaged in effecting a presentation of a new combination of perforations to the contacts.

Another object of the invention, having to do with the contact sensing of a perforated sheet as in the present preferred embodiment of the invention, is to insure good electrical contact as each successive group of perforations is brought into position. This is accomplished by specially shaping the contact points and causing a relative sliding movement between each point and a contact bar, plate, or point at the other side of the sheet while at the same time applying pressure in an engaging direction.

A further object of the invention is to provide means for stopping the operation of the machine during the automatic reproduction of any series of figures or other characters when at least two perforations are not presented in proper registration with the sensing device except, of course, where intentional spacing is desired as in decimal spacing in which case other means come into control to carry on the operation of the machine.

A still further object of the invention is to provide for accurately and reliably indicating, by means of perforations or other impressions, any one of ten numerals within the small area of a type impression. This is accomplished in a preferred form of the invention by using combinations of two out of a group of five perforating pins so closely arranged as to all rest substantially within the space allotted to a single type impression. Thus ten different combinations of pins of the group are available yet sufficient insulating fields of paper exist between the individual perforations. A special wiring circuit including five relays conveniently controls the type actuating magnets ten in number.

In the accompanying drawings, wherein is shown one of various possible embodiments of the invention:

Fig. 2 is a view in front elevation of the typewriter unit shown in Fig. 1, with a portion of the front frame and the entire keyboard eliminated to show more clearly particular features of the present invention.

Fig. 3 is a front elevation of a portion of the mechanism shown in Fig. 2 showing one numeral type bar in position to operate certain selected perforating pins.

Fig. 4 is a view similar to Fig. 3 showing a different numeral type bar in operative position to act upon a different selection of perforating pins of the same group.

Fig. 5 is a view in transverse section at the right end of the machine. The view is taken substantially along the line 5—5 of Fig. 2 looking in the direction of the arrows.

Fig. 6 is a fragmentary sectional view of the sheet locating mechanism shown in Fig. 5, showing the operating devices for the sheet punches and the locating pins.

Fig. 7 is a fragmentary sectional view showing one of the sheet punches for forming the locating apertures at the edges of the sheets.

Fig. 8 is a view in perspective of one of the locating-pin slides.

Fig. 9 is a fragmentary view in front elevation of certain supplemental-frame parts. This view shows the sheet perforating devices and the sensing devices in front elevation.

Fig. 10 is a view in transverse section taken on the line 10—10 of Fig. 9 looking in the direction of the arrows. In this view the carriage is located in position for the sheet-perforating operation.

Fig. 11 is a view in section taken longitudinally of the carriage substantially along the line 11—11 of Fig. 9 looking in the direction of the arrows.

Fig. 12 is a view in transverse section taken on the line 10—10 of Fig. 9 but in this view the carriage has been moved to sheet-sensing position.

Fig. 13 is a view in transverse section taken along the line 13—13 of Fig. 9 looking in the direction of the arrows, but the carriage is located in sheet-perforating position.

Fig. 14 is a sectional view taken along the line 14—14 of Fig. 13 looking in the direction of the arrows.

Fig. 15 is a somewhat schematic view showing the key-lever and type-bar action in its relation to the roller platen and the perforating pins.

Fig. 16 is a view showing the upper part of the type-bar in its relation to the platen and to the perforating pins and showing also brush contacts carried by the main frame for engagement with corresponding bars mounted on the carriage.

Fig. 17 is a fragmentary view of the rear of the typewriter unit showing the carriage drive and escapement-control and also showing the mounting of actuating magnets for accomplishing various objects of the invention.

Fig. 18 is a schematic view taken in transverse section of the machine, particularly showing the universal bar and the escapement action and the mechanism for opening the electrical circuits prior to the release of the carriage for letter or number feeding.

Fig. 19 is a diagrammatic view showing the electrical circuits including the type-bar actuating-magnets, the decimal-spacing magnet, relays for said magnets and the sensing device for the various selections of perforations from the perforated pin group.

Fig. 20 is another diagrammatic view showing in structural fashion the mechanism by which engagement is constantly preserved as the carriage proceeds in its step-by-step feed, and showing further the automatic decimal spacing structure and circuit connections.

Fig. 21 is a sectional view taken on the line 21—21 of Fig. 20 showing the brush connections and decimal-spacing mechanism. The position of the carriage is assumed to present the conductor bars over the spring contact set.

Fig. 22 is a view in top plan of the structure shown in Fig. 20.

Fig. 23 is a view of the right end of the carriage with parts omitted to more clearly show certain operating mechanism.

Figure 1:
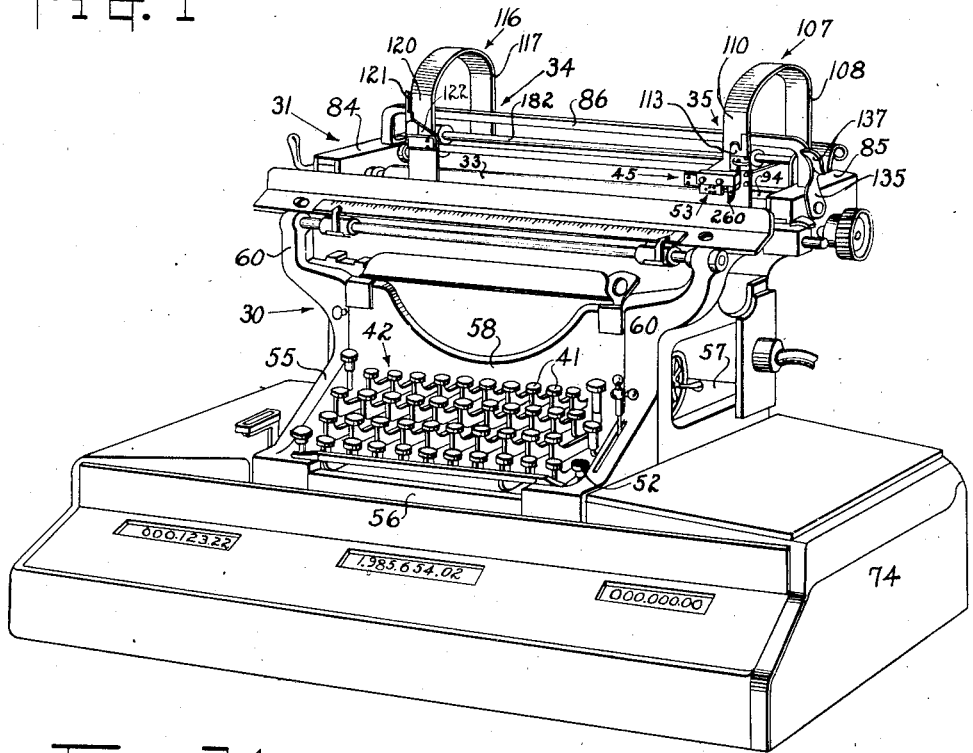
Fig. 1 is a view in perspective showing a typewriter unit embodying the invention, and indicating one possible application of the unit which is with a computing mechanism enclosed in a base upon which the typewriter unit is mounted.

Proceeding now to a detailed description of the mechanism shown in the drawings:

General features

As a mounting for the operating parts of the machine, a substantially standard Underwood main frame may be utilized. This frame is indicated generally by the numeral 30. On the frame a motor-driven escapement-controlled carriage 31 is mounted for step feeding movement from right to left and for return from left to right to re-tension a spring motor 32. The carriage supports a roller platen 33 of conventional type. A supplemental frame 34 is mounted on the carriage and is provided with means indicated generally at 35 for guiding a sheet of paper 36 down in front of the platen and is further provided with punching means 37 at opposite ends of the supplemental frame for punching locating apertures at opposite side margins of the sheet. Locating means indicated at 38 are mounted in the supplemental frame and adapted to enter the punched holes previously made by the punching means to thereby accurately locate the sheet with respect to the guiding means and with respect to the platen and all appurtenances mounted on the carriage. At the rear of the main frame a number of electromagnets are mounted as generally indicated at 40, these magnets having armatures with mechanical connections to certain numeral keys 41 of a keyboard 42 at the front of the typewriter unit. The magnets 40 are controlled electrically by a series of relays 43 shown in Fig. 19 of the drawings and these relays are in turn controlled by a group of sensing pins indicated generally at 44 in Figs. 2, 19 and 20 carried on a member or head 45 mounted on the supplemental frame of the carriage with provision for limited sliding movement relative to the carriage. There is also an electromagnet 46 at the rear of the main frame (see Fig. 18) having as a part of its function to operate the carriage escapement for the purpose of stepping the carriage to present a spaced combination of perforations to the sensing devices as in the case of decimal spacing. Mounted in proximity to this electromagnet 46 is a set of interrupter contacts 47—48 which are included in an electrical circuit with the sensing devices and mechanically connected with a universal bar 50 and its associated escapement-rocker-frame 51 in such a fashion that before any step of letter or number feeding is effective the circuit through the sensing contacts is broken (Figs. 17, 18 and 19). A suitable main switch indicated at 52 (Figs. 1 and 19) is located at the front of the machine, either as a part of or adjacent to the keyboard and suitable resistors and a condenser are included in the electrical circuits for purposes that will be well understood.

In proximity to the group of sensing devices and preferably directly below the same is a group of perforating pins indicated generally at 53. These pins are mounted upon the member 45 which is in turn mounted upon the supplemental frame and travels with the carriage except when being held by parts mounted on the main frame, when it is desired to perforate the sheet by successively operating a plurality of numeral keys to a common printing point to bring vari-shaped hammers at the ends of the respective types into operation upon selected combinations of the perforating pin group. The particular type-bar heads which effect the perforations are indicated generally by the numeral 54.

By reason of the mechanism and the magnets and controls briefly referred to above, it is possible to introduce a sheet to a position in front of a roller platen in a typewriter unit, punch locating holes in opposite side margins of the sheet, letter-feed the sheet by the spring-motored escapement-controlled carriage, type a series of digits and perforate the sheet with different combinations of perforations each characteristic of the particular digit typed, whereupon the sheet may be later relocated in the machine in accordance with the positions of the punched locating holes and upon movement of the carriage to a predetermined position and closing of the main switch at the keyboard the sensing devices engage the first combination of perforations in the series, energizing relays which control the energization of a particular magnet to operate a corresponding type bar and retype the number at another place on the sheet. The escapement operating in its usual way to letter feed the carriage presents the next combination of perforations to the sensing devices, another relay operation takes place, and electromagnetic means throws up another type bar or the same one to type another digit in the series. This goes on automatically under the control of the escapement and the sensing devices until the entire series has been typed. Should a decimal column or space occur between any two digits, means are provided to automatically step the carriage an additional space and present the next perforated combination to the sensing devices.

*Frame structure*

The main frame 30 of the typewriter unit is substantially in the conventional Underwood form of a skeletonized box comprising side members 55 connected at the front by a bar 56 and at the rear by a bar 57 (Figs. 1 and 17) and having the usual front plate 58. Just rearwardly of the keyboard 42 upwardly extending arms 60 rise at either side of the frame to support a front carriage-rail 61. At the rear of the main frame (see Fig. 18) upwardly extending arms 62 rotatably support a square shaft 63 upon which is mounted a conventional tabulator rack 64 in the form of a bail, the opposite ends of which 65 are secured to the square shaft and have extending there-between a grooved rod 66 upon which are mounted a plurality of adjustable tabulator stops 67.

The rear bracket arms 62 have fixed thereto at their upper ends a rear carriage-rail 68 in the form of a cylindrical rod. The main frame has its two side members 55 connected by a plate 71 preferably in the form of an angle plate adapted to support a series of electromagnets. Similarly across the lower part of the main frame at the rear there is fixed an angle plate 72 adapted to support other electromagnets. The main frame is provided with feet 73 adapted to rest the unit on a table or, when the unit is used with a bookkeeping machine, upon a computing-mechanism-base as indicated at 74 in Fig. 1. When the unit is mounted upon the base as shown in Fig. 1, the relay mechanism of the invention may be housed by said base. In the present showing the relay mechanism is contained in a separate relay box 75 (Fig. 20) adapted to be arranged outside of the machine and connected by suitable cables.

A frame 77 of carriage 31 is basically of the conventional rectangular form as it has been employed in Underwood typewriters for many years. It has at its front center a boss 78 (Fig. 5) in which is journaled a roller 80 which rides on a track 81 on the carriage rail 61 which forms a part of the main frame. At the rear the carriage frame is provided with rollers 82 adapted to bear on the rear carriage rail 68 mounted on the main frame, and the carriage frame is also provided at the rear with engaging guides 83 circumscribing the rear carriage rail 68. Conventionally such carriage frames have been equipped with end plates of a sheet metal angular construction which are employed in the present machine with certain modifications to adapt them to this invention. The left end plate is indicated at 84 and the right end plate at 85 (see Figs. 1 to 6). These plates in effect form the base structure of the supplemental frame 34 fixed to the carriage frame, and they are connected by a transverse rail 86 upon which is suspended and partially supported the paper guides, punches, sensing devices, perforating pins and locating pins which will be hereinafter described in detail.

A shaft 87 is journaled at its opposite ends in the sheet metal angular frame pieces 84 and 85 and this shaft may be considered as a part of the supplemental frame structure. To the angular frame piece 85 an arm 92 is secured by screws 93 and this arm has fixed thereto a square shaft 94 which extends for a short distance toward the middle of the carriage frame and this shaft has a supporting function and may be considered as a part of the supplemental frame. The devices mounted upon this shaft will be described in detail later.

Fixed to the right side wall of the main frame is an upstanding bracket 95 carrying a short rod 96 extending toward the right which may be considered as a frame part carrying a stop and latch device 97, the purpose of which will be later described. The main frame 30 supports the usual segment plate 98 about midway between front and rear and standing in a vertical transverse plane (Figs. 2, 3 and 4), and this segment plate has an upstanding arm 100 carrying an adjustable stop screw 101 adapted to co-operate with devices carried on the supplemental frame as will be described later.

*Sheet punching and locating mechanism*

The angular member 85 at the right end of the carriage has an inwardly extending platform 102 terminating in a downturned flange 103 (see Fig. 5). This platform has at its inner forward corner a bracket 104 suitably fixed to the rail 86. An inverted U-shaped paper-guide member 107 has its rear stem 108 turned inwardly and welded to the platform 102, and its front stem 110 extends downwardly and is secured to the front of an extension 106 of bracket 104. The forward stem of the U has also a lateral guide lip 112 at the right side against which the right side edge of the paper is positioned when introducing the paper to the machine. Below the lip 112 the paper guide has an inturned portion 113 with its upper edge flared slightly toward the front of the machine. This inturned portion 113 provides a front paper guide and forms with the front stem of the U of the paper guide a channel 114 just wide enough to freely receive the right side margin of the paper (see Fig. 5). The right side guide just described is in the nature of a fixed guide for the right margin of the paper and at the left of the machine there is a somewhat similar guiding device which is adjustably mounted upon the shaft 87. The adjustment permits the movement of the left paper guide to desired position transversely of the carriage and its fixation in any such position between suitable collars. The left paper guide has a U-shaped guide member 116, a rear stem 117 of the U extending downwardly to suitable connection with a tie rod 118, the latter extending from the left end of the carriage frame through the downwardly extending flange 103 of the platform 102 at the right of the carriage frame and being secured in the opposite ends of the carriage frame. A front stem 120 of the U-shaped piece 116 forms the left side rear paper guide. There is an outwardly turned lip 121 on this front stem which serves as the register for the left edge of the paper sheet, and as in the case of the right side guide there is an inwardly turned portion 122 having a forwardly flared upper edge which portion provides a channel 124 in conjunction with the rear paper guide, for the reception of the left side margin of the paper sheet (see Figs. 1, 2 and 6). The stem of the U which forms the rear paper guide may be extended downwardly almost to the roller platen 33. The inwardly turned portion which forms the front paper guide may be further extended downwardly as indicated at 125 and directed inside of a forwardly flared lip 126 of a thin metal paper table and apron 127 which passes around the under side of the roller platen and to a degree upwardly at its forward side. This relation is shown clearly in Fig. 5 in connection with a similar downward extension 128 which is provided on the right paper guide, but as this piece is somewhat differently mounted it will be described later in connection with the sheet perforating and sensing devices. A front paper bail 130 has its ends secured in supporting clips 131 and 132 fixed to the front paper guides 113 and 122 respectively and this bail serves to prevent transverse buckling of the paper sheet.

From the foregoing it will be seen that paper sheets or cards may be moved into position at the front side of the roller platen 33 and urged downwardly around the lower half of the platen between the latter and the forward extension of the paper apron 127. Owing to the adjustability of the left side paper guide the paper sheet or card may be very closely fitted between lips 112 and 121 of the left and right side paper guides, respectively. The side registers provided by these lips are extended downwardly in the form of the bend made in the paper guides to form the front paper-guide members 113 and 122 so that there is a considerable vertical length of side register on each of the paper guides. By reason of this construction the introduced sheets are prevented from tilting or cocking as they are introduced downwardly a sufficient distance to be engaged by the usual front and rear feed-roll sets 133 and 134 which are set apart from the platen in customary fashion by the manipulation of a lever 135 at the right side of the carriage frame. This lever is supported upon a stud 136 fixed at the right end of the carriage frame and comprises a finger piece 137 and an arm 138 which latter is connected by a link 140 to the crank end 141 of a shaft 142 suitably journaled in the carriage frame ends (see Fig. 23). This shaft has notches 143 at intervals along its length to receive arms 144 of bell crank levers 145 pivoted at 146 on arms 147 rigid on a shaft 148 which in turn is fixed in the ends of the carriage frame. The shaft 148 also mounts loosely a series of forwardly and upwardly extending arms 150 notched at their outer ends to receive a rod 151 upon which are mounted the front feed rollers 133, and the shaft 148 further mounts a series of rearwardly and upwardly extending arms 152 notched at their outer ends to receive a rod 153 upon which is mounted the series of feed rollers 134. The shaft 148 is also provided with fixed arms 154 extending rearwardly and below which coiled compression springs 155 are arranged supported by flanges 156 extending from levers 150. A pin 157 extends laterally from each lever arm 150 and these pins are adapted to be engaged by the arms 144 of bell crank levers 145. When the finger piece 137 is in its upper position the arms 144 of bell cranks 145 lie in the notches 143 in shaft 142 allowing the sets of feed rollers 133 and 134 to be urged against the platen by springs, one of which is shown at 155. When it is desired to introduce a sheet the finger piece 137 is moved forwardly rotating shaft 142 to force arms 144 of the bell crank levers 145 upwardly to a point where they ride on the circumference of the shaft 142 above the notches 143. In this movement the bell cranks 145 pivot at 146 and arms 158 thereof bear on the rod 153 and throw off the rear rollers. Simultaneously the pins 157 are picked up and the levers 150 are rotated around shaft 148 to throw off the front feed rollers 133 and compress the springs 155. The parts are held in this position owing to the presentation of the circumference of the shaft 142 to the bell crank arms 144 and this serves to hold the finger piece in its forwardly moved position. With the rollers 133 and 134 away from the platen, the leading end of a sheet 36 may be passed around the bottom of the platen and as far as desired upwardly in front of the paper table 127. The just described mechanism for operating the feed rollers is standard Underwood construction and this mechanism is supplemented in furtherance of the present invention by an additional link 159 connected to the arm 138 of the finger operated lever 135 and having its opposite end connected to a short arm 160 fixed to the rock shaft 87 hereinbefore referred to as adjustably supporting the left-hand paper-guide (Fig. 23).

Figure 24:
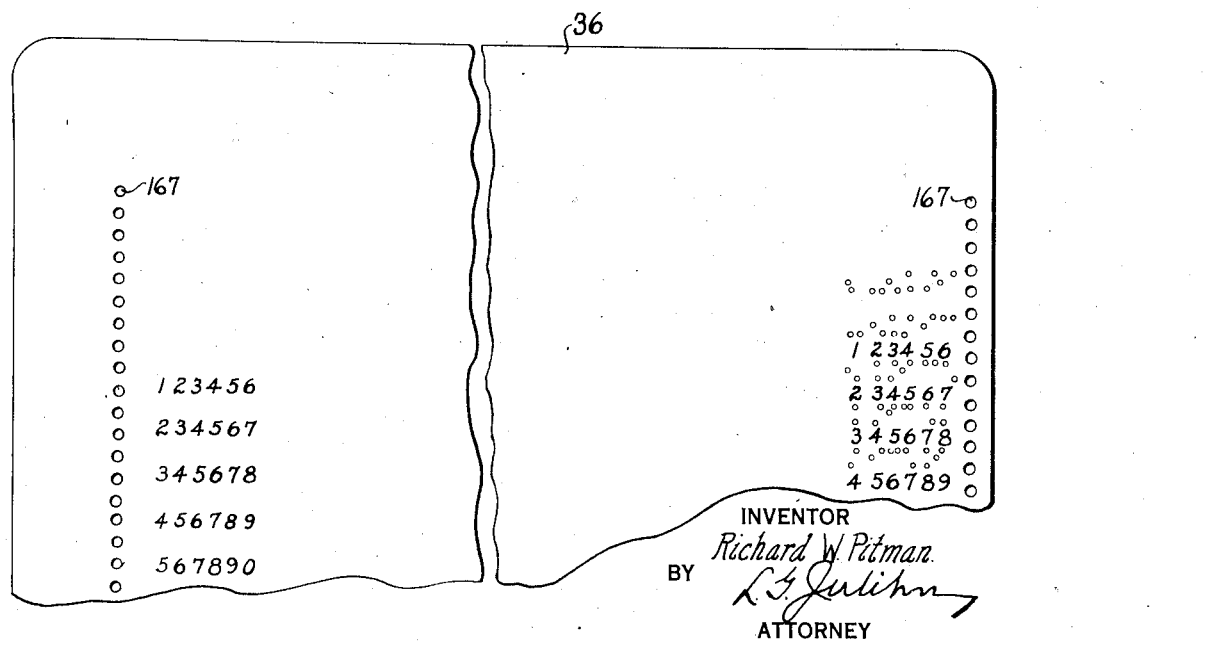
Fig. 24 is a face view of a work sheet.

Mounted on this rock shaft are the operating devices for punches 161 and these operating devices are in the form of cams 162 secured to the rock shaft adjacent each paper guide. As the finger lever 135 is operated forwardly or counter-clockwise in Fig. 23 the feed rollers 133 and 134 will be forced away from the bottom of the platen and high points 163 of operating cams 162 will actuate the punches and compress springs 164 coiled around the punches between enlarged round heads 165 thereof and the rear paper guides (see Figs. 5, 6 and 7). Continued movement of the finger piece forwardly to its forward held position will cause the high points 163 of the cams to pass by the punches allowing the springs 164 to force the punches rearwardly to their normal inoperative positions. Thus in introducing a sheet to position in the machine full forward movement of the finger piece sets the feed rolls away from the platen to allow the sheet to be introduced and causes a movement of the punches which is of no consequence as no sheet is in the machine at that time. After the sheet has been introduced to its desired line-space position the finger piece 137 is operated rearwardly or in a clockwise direction as viewed in Fig. 23 and is assisted in this movement by springs 155 and by a torsion spring 166 around the pivot stud 136. This rearward or clockwise movement again passes the high points 163 of the cams 162 over the rounded heads 165 of the punches urging the punches forwardly against the action of springs 164 and producing sheet-locating apertures 167 at opposite side margins of the sheet, as indicated in Fig. 24. Full return of the finger piece to normal position causes the high points of the cams to pass beyond the punches allowing flat faces 168 to take position opposite the punch ends and permitting the springs 164 to retract the punches from the paper. The forward ends of the punches are held in retracted position in holes 170 formed in the front stems of the U-shaped paper guides. The dies for the punches are constituted by the inturned front paper guides 113 and 122 suitably perforated to receive the leading ends of the punches.

As the finger piece 137 is moved back to normal position the punches are retracted and the feed rollers are abandoned to the action of springs 155 which force them against the paper through suitable apertures in the apron 127, to hold the paper firmly against the platen so that the paper will be moved with the carriage.

In the paper guide members, and preferably directly above the punch dies, are holes 171 in the front paper guide members and holes 172 in the rear paper guide members (see Fig. 6), adapted to slidably receive locating pins 173 projecting forwardly from downturned ears 174 on slide members 175 mounted on the paper guides (Figs. 5, 6 and 8). The left side slide member is mounted on a cross strut 176 connecting the front and rear stems of the U of the left side paper guide. The slide member is slotted at 177 and two stud screws 178 are threaded into the cross strut. A pull spring 180 has one end connected to an upwardly extending ear 181 at the rear of the slide and the other end connected to the front stem of the paper guide. The spring tends to hold the slide forwardly and carry the pin 173 into the hole 171 in the front paper guide. At the right side of the machine the slide member 175 is mounted upon the platform 102 and is similarly slotted and held in sliding relation therewith and has a similar spring holding it normally in a forward position.

To operate the slide members 175 to retract the locating pins from the channels 124 between the front and rear paper guide members, a rock shaft 182 is journaled in ears 183 of the supplemental frame. This rock shaft has adjustably fixed thereon collars 184, one for each slide member, from each of which depends a pin 185 which enters a recess 186 in the slide and which is adapted to pick up the slide as the pin is rotated and carry it rearwardly against the action of its spring until the ends of the locating pins are retracted from the paper guide channels permitting entry of the sheet (see Figs. 5, 6 and 8).

For operating the rock shaft 182, a finger piece 187 is fixed to the left end of the shaft 182 and is held rearwardly by a torsion spring 188 surrounding the shaft between the finger piece and one of the ears 183. The action of the spring is limited by the pin 185 abutting an edge 190 at the front of slot 186 and by the ear 174 of the slide abutting the paper guide. Normally, the torsion spring 188 causes both slide members to advance to bring the locating pins across the paper guide channels 114 and 124.

After a sheet has been introduced and punched as heretofore described and the further operations of typing and perforating have been performed, as will be later herein described in detail, the sheet may be withdrawn from the machine and subsequently restored thereto and located by entering the locating pins 173 into the punch holes previously made. In re-entering the sheet to the machine, the finger piece 187 is moved forwardly to retract the locating pins until the forward or leading edge of the sheet has passed into the guide channels below the pins. The finger piece is then released to the action of the torsion spring 188 and as the sheet is further fed by finger manipulation of the sheet against the forward stems of the U-shaped guides, the punched holes will eventually come opposite the locating pins which, then under pressure of the torsion spring, will enter the punched holes at opposite sides of the sheet and accurately locate the sheet in line-spaced position from its previous position in the machine. It will be understood that prior to the re-entry of the sheet to the machine it will be desirable to operate the other finger piece 137 which retracts the feed rolls and idly moves the punches in and out so that when the sheet is finally located by the locating pins a reverse movement of finger piece 137 again operates the punches making two new punched holes accurately line-spaced from those previously made. Thus, each time a sheet is introduced, two new locating holes are made which provide for relocating the sheet on its next introduction.

Type action and carriage control

The type action and carriage control are substantially conventional Underwood structure. As shown in Fig. 1 there is a four-bank keyboard 42 and the upper bank of this keyboard carries the keys 41 for the numeral types 0 to 9. Referring to Fig. 15 of the drawings, one of the numeral keys 41 is shown on the forward end of a key lever 201 which is fulcrumed at 202 and spring pressed upwardly as indicated at 203. A bell crank intermediate lever 204 pivotal on rod 205 has one arm 206 slotted at 207 to engage a short pin 208 extending from the side of the key lever 201. The other arm 210 of the bell crank carries a short pin 211 which engages the lower end of a type bar 212 in a slot 213. The type bar is swingable about a fulcrum wire 214 and is movable from a full line position shown in Fig. 15 to the dot-and-dash position shown therein. This movement may be effected manually by full depression of a key 41 or it may be a power driven operation effective upon slight movement of the key by a means which is well known and not shown herein, or it may be electromatically effected by the magnet armature and connections shown in Fig. 15, which will be later described in detail.

The key lever 201 carries a downwardly extending link 215 intended for the setting of pins in a register in order to adapt the unit for coaction with a computing mechanism of the type indicated in Fig. 1 of the drawings or any other suitable device. The aforesaid U. S. patent to Hart No. 1,270,411 shows in detail the computing mechanism illustrated in Figure 1 of the drawings.

Fig. 17 of the drawings shows the mechanism by which operation of the type bars either manual, power-driven or electromagnetic, effects the so-called letter feed movement of the carriage. The universal bar 50, previously mentioned, is slidably mounted in the segment 98 and fixed to escapement-rocker-frame 51 pivoted at 216 in a cast bracket 217 secured to the main frame of the machine centrally thereof. The movement of each type bar to a position approximate the printing position causes a heel 218 of the type bar to pick up the universal bar and move it rearwardly, thereby rocking the frame 51 on pivots 216 and rocking a dog frame 200 pivoted at 219 on bracket 217 to move a so-called rigid dog 220 into abutting position behind one of the teeth 221 of an escapement wheel 222. The same movement which carries the rigid dog into this position carries a pivoted or movable dog 223 out of engagement with the tooth of the escapement wheel and a spring 224 swings it on its pivot 225 against a stop 226. This is done while the type bar is making its last arc of movement into printing engagement. As the key is released and the key lever returned by spring means, the rocker frame is returned by a spring 227 and the dog frame 200 is withdrawn by the spring 224, advancing the pivoted dog into position to be engaged by the adjacent tooth of the escapement wheel, so that as the rigid dog moves forwardly out of engagement with its tooth, the escapement wheel may pick up the pivoted dog and advance one step until the pivoted dog is carried over against a stop 228.

The carriage frame carries a rack 229 having teeth 230 in engagement with a pinion 231 which is coupled for rotation with the escapement wheel by means of conventional diametrically opposed spring pressed dogs 232. The carriage spring-motor 32 may be of conventional type mounted on the main frame and having a tape 233 connected to the right end of the carriage as indicated at 234, and this spring tends constantly to urge the carriage in a direction of movement from right to left, but the action of the spring is controlled by the escapement wheel 222 coupled to the pinion 231 which is in mesh with the teeth of rack 229 and in the usual operation is released one step at a time as just previously described.

The entire carriage and its supplemental frame may be returned from left to right, rewinding the motor spring in the movement, by the usual carriage return and line space lever not shown. In this movement of the carriage the ratchet wheel is held against rotation by the engaging dogs 232, and the rack 229 is left in engagement with the pinion 231. The pinion is therefore rotated by the longitudinal movement of the carriage rack and the teeth of the pinion click by the engaging dogs.

It will be understood that the rack 229 is pivotally mounted in the usual way and adapted to be operated by a finger piece to remove it from engagement with the pinion for tabulating.

The preceding detailed description of the well known carriage escapement mechanism is made owing to the fact that the invention in certain of its aspects includes in the combination a motor-driven escapement-controlled carriage, and further for the reason that the universal bar and escapement mechanism function in the automatic decimal spacing operation, which will be hereinafter described.

The type bars 212 are in the usual segmental arrangement, adapted to move their heads 54 to a common printing point by swinging the bars to a central type guide 236 secured to the upper part of segment 98.

Perforating and sensing devices

Each of the different numeral type bars has its free end or head formed with a hammer 240, and these hammers differ in shape or position, as shown in Figs. 15 and 16, in order to select certain combinations of two out of five perforating pins arranged in the group 53 on a plate 241 near the right-hand paper-guide. The plate 241 is secured at its right end to a box structure 242 which slidably fits the squared shaft 94 hereinbefore referred to as a part of the carriage-frame construction. The plate 241 is secured to the box structure by screws 243 which also secure the downward extension of the front guide member at the right side of the machine, which has been previously indicated by the numeral 128.

Perforating pins 246 are arranged in a group of five in the manner of arrangement shown at 53 in Figs. 2, 3, 4 and 14, and they are preferably of a uniform diameter throughout their lengths, except for a central shouldered and reduced portion indicated at 247 in Figs. 10 and 11. Forward ends of the perforating pins are slidably supported in a supplemental plate 248 suitably secured to the front of the main plate 241 which latter is recessed to receive a strip of spring metal 250 held in position relatively to the plate 241 by a riveted clip 251 and screws 252 and provided with notches 253 providing for individual engagement with the perforated pins at their reduced central portions, and normally flexed to urge the pins forwardly to position the perforating ends of the pins forwardly of the introductory line of feed of the paper sheet.

The squared shaft 94 has its inner end recessed, and has a slot 254 along one side communicating with this recess. The box-like structure of the slide member has a square pin 255 driven upwardly from one side as shown clearly in Figs. 10, 11 and 12. This pin extends transversely through the slot in the squared shaft and across a cylindrical bore 256 therein to bear against the end of a coiled compression spring 257 located in the bore and having its opposite end reacting against the wall at the inner end of the bore. The squared shaft 94 projects inwardly to the down-turned flange 103 of the platform 102 of the right paper guide structure and is held thereagainst by a screw 258. A washer 259 of rubber or other suitable material is arranged around the left end of the squared shaft to serve as a cushioning device for return movements of the slide member under the influence of spring 257.

It will be obvious from the foregoing that the group of perforating pins is mounted upon an assembly of parts or head including the plate 241 which is essentially a part of, and movable with, the supplemental frame of the carriage, but which has provision for being held for a limited period while the carriage proceeds in its step-by-step travel. During this holding period, the spring 257 is compressed, and when the slide assembly or head is released from its held position the spring immediately restores it to its original relation to the carriage. When the carriage has moved to present the group of perforating pins directly above the printing point, a depending stop finger 260 secured to the plate 241 abuts the screw 101 secured at the upper end of the bracket 100 which is attached to segment 98. Thus further movement of the group of punches in a carriage-feed direction is prevented. This position is shown by dot-and-dash lines in Fig. 2 of the drawings, and it is obvious from that figure that any one of the numeral types that is actuated will engage and operate a selected combination of two of the perforating pins. These combinations are represented in the diagram Fig. 19 of the drawings, and the shapes of the hammers 240 are indicated by the dotted lines embracing or bounding each of the two darkened dots. It will be seen that the shape of the hammer on the type head for the numeral 1 is such as to actuate the two lower left hand pins of the group. The hammer for the numeral 2 type actuates the two lowermost perforating pins. The hammer for numeral 4 type operates the two right hand pins of the group, and so on, each hammer selecting a different combination of pins and punching a different combination of holes through a paper sheet located in the machine as heretofore described. According to a preferred form of the invention, the hammers 240 are directly beyond and integral with the type heads 54 and therefore perforate the sheet some distance directly above the typed numeral produced by impact of the type through the usual ribbon 265 with the sheet on the carriage. As the particular hammers come into operation the individual perforating pins are caused to pass through the paper into die holes 266 formed in a depending plate portion 267 of the box structure 242. The blanks removed from the paper are pushed through these holes and may be conducted in any suitable way from the machine. Whichever combination of perforating pins is selected the spring strip 250 is moved rearwardly by the shoulders on the selected pins as shown in Fig. 13 and the reduced portions of the other pins are sufficient in length to permit this movement without actuating the other pins of the group. As soon as the hammer is retracted by the return movement of the type action, the spring strip 250 restores the selected pins to their original positions.

Directly above the group of perforating pins is the similarly arranged group 44 of five sensing contacts carried in an insulating block 271 secured to the plate 241 and having a shouldered portion 272 projecting through an aperture 273 in said plate. These sensing contacts are in the form of pins slidable in holes in the insulation block and having pointed ends 275 substantially conical, which are normally urged against a plate 274 of electrical conductivity. This plate is fixed with the platform 102 of the right guide member and projects through the channel formed by the assembly of plate 241 and the box structure 242 which is slidable on the squared shaft 94. Spring fingers 276 of electrical conductivity suitably insulated from each other as indicated clearly in Figs. 11 and 13 have their free ends bearing against the forward ends of the sensing contact pins and tend to urge the pointed ends of these pins into engagement with the front surface of plate 274. The shape of the contact pins facilitates the easy introduction of the paper sheet in front of the plate 274, the pins being cammed forwardly by the leading edge of the paper sheet as it is introduced. It will be obvious therefore that during the typing and perforating operations the sensing contact pins are held separated from the plate 274 by the interposition of the paper sheet.

At the right side of the machine, bracket 95, heretofore referred to as a part of the frame structure, carries shaft 96 which latter has adjustably mounted upon it a latch member indicated generally at 97. This latch member comprises a block 277 slidable on shaft 96 and adapted to be secured in any desired position by screws 278. On the rear of the block a latch dog 280 is pivoted at 281 and held in its upper position by a spring 282, one end of which is secured to the dog at 283 and the other end of which is secured to the block at 284.

In another position of the carriage the downwardly extending stop finger 260 engages an edge 286 of the latch dog 280 which prevents further movement of the slide assembly or head with the carriage in its step feed. For a limited time the slide member carrying the sensing contacts is held while the carriage proceeds in its step-by-step movement. The latch block 277 is so adjusted that the latch will engage the depending finger 260 when a perforated sheet is located in the machine by means of the locating pins 173 entering the punched holes on opposite sides of the sheet and a combination of perforations is presented in position opposite corresponding sensing contacts. Under these conditions the pointed ends of the sensing contacts pass through the perforations and engage the conducting plate 274, whereupon through relay circuits and magnets and other connections to be later described herein the numeral type bar of which the particular combination of perforations is symbolic will be actuated to reproduce the particular number at another place on the sheet. This automatic movement of the type bar acts upon the escapement rocker to permit a step of carriage feed which thereupon presents another combination of perforations opposite the sensing devices and again two pins of the group of five enter perforations and in similar manner cause the throw of a numeral type bar of which this second combination of perforations is symbolic. This action continues automatically until the entire series of figures has been typed. As the last number of the series is typed and is followed by the customary escapement step, a roller 287 mounted on a bracket arm 285 fixed to the right hand end of the carriage frame rides upon a cam face 288 of latch dog 280 and depresses it around its pivot point to release the depending stop finger 260 of the slide, whereupon the coil spring 257 acting in the same way as it does in connection with the punching operation throws the slide member or perforating and sensing head back to its original position relative to the carriage.

*Electrical circuits, controls and actuating devices for the automatic reproduction of previously typed and perforated characters*

In Fig. 19 of the drawings the individual sensing contacts of the group are designated for convenience by the letters a, b, c, d and e. At the bottom of this figure the perforating pin group is indicated on ten different panels illustrative of the same group of perforating pins as it is acted upon by each of ten different numeral type bars. The type bars are given their respective numerals on the diagram and, as previously stated, the hammers of each type-bar-head are indicated in dotted lines. From the shaded dots on the panels, indicative of the combination of perforations for each individual numeral type bar, dotted lines are extended to indicate the positions of the perforations in the sheet which are sensed by combinations of sensing pins in the group a, b, c, d, e. The sheet is omitted from the diagram for the sake of clearness. The conductor plate 274 is indicated by the circle around the group of sensing contacts.

A series of five magnets is shown in Fig. 19 as controlling a plurality of relays, the first magnet 290 controlling a single relay 291, the second magnet 292 controlling two relays 293 and 294, the third magnet 295 controlling three relays 296, 297 and 298, the fourth magnet 300 controlling four relays 301, 302, 303 and 304, and the fifth magnet 305 controlling four relays 306, 307, 308 and 310.

When the main switch 52 is closed the various combinations of perforations in the sheet 36 are moved by the carriage to the sensing group while the latter is held against movement with the carriage and the sensing pins pass through the perforations and make contact with the plate 274 which closes circuits through certain of the magnets 290, 292, 295, 300 and 305. Energization of certain of these magnets operates one or the other of the relay groups and closes a circuit through one of the ten magnets 40 indicated at the right hand side of the diagram Fig. 19. These are the magnets which are mounted in two groups on the upper and lower angle members 71 and 72 at the rear of the frame as heretofore referred to and as shown clearly in Figs. 5 and 18 of the drawings. Whichever magnet is energized by the particular relay group under control of the sensing contacts through any given combination of perforations actuates through its armature 311 a rod 312 which moves bell crank lever 204 (see Fig. 15) on its pivot 205 throwing down the corresponding key lever and key in duplication of the prior manual or power-driven movement, and throwing up the corresponding type bar to cause a reproduction of the character or number originally typed and perforated at another place on the sheet. Movement of the carriage presents the next combination of perforations to the sensing devices causing another type action, assuming that the main switch is held closed, and so on until the entire series of numbers is reproduced.

As the carriage moves in its step feed to pass one combination of perforations out of its engagement by the sensing contact pins, to bring the next combination of perforations into position opposite the pin group, the movement is facilitated by the conical shape of the ends of the pins as by reason of this shape they ride easily over the edges of the paper at the perforations, and over the paper between perforations, into engagement with the contact plate at the next set of perforations. It will be seen that the engagement of the sensing contact pins with the plate at the next set of perforations is of a sliding character and inasmuch as the pins are pointed, a good clean contact engagement is insured.

In order to prevent sparking when the sensing contact pins are separated from the contact plate as in the travel of the carriage during its step feed, a switch 313 is provided which breaks the circuit including the sensing contacts just prior to each step movement of the carriage. This switch is indicated diagrammatically at the extreme right hand side of the diagram Fig. 19 and it is shown structurally in Figs. 17 and 18. It involves a pair of normally closed contacts 47 and 48 in the main circuit with the sensing device and just before any numeral type bar reaches its typing position in the automatic reproduction, under control of the sensing devices, these contacts are opened, thus breaking the electrical circuit at the contacts before the escapement movement of the carriage separates the sensing contact pins from the contact plate 274. To obtain this preliminary break in the circuit, contact 47 is mounted upon a fixed bracket 316 at the rear of the machine. This bracket has an upstanding arm carrying two rearwardly extending spaced ears 318, each notched as indicated at 319 to receive a floating contact arm 320 of V construction, having its upper ends engaged in the notches of ears 318. The lower end of the V arm or plate carries the movable contact 48 and a coiled pull spring 321 has its lower end connected in the crotch of the V and its upper end connected to an adjustable collar 322 threaded on to a rod 323, the rear end 324 of which is slidably supported in an extension 325 of an armature 326 of the magnet 46, the purpose of which magnet will be described later. The forward end of the rod 323 is pivotally supported on an arm 328, the lower end of which is fixed on a rock shaft 330 journaled in the side frame pieces of the machine. This rock shaft, at about the middle of its length, has a rock arm 331 fixed thereto having a stud 332 at its outer end with a shank which engages in a slot 333 of a forwardly extending arm 334 which forms a part of the escapement rocker frame 51. It follows that each time the rocker frame is operated to institute a step feed of the carriage the rod 323 will be moved forwardly carrying with it the upper end of spring 321 and this spring when sufficiently moved beyond dead center of the fulcrum points of the V-shaped contact arm 320 will cause the latter to fulcrum in the notches 319 and swing forwardly, thus breaking the engagement of the contacts 47—48. Conversely, when the type bar swings downwardly the escapement rocker swings in the opposite direction, the rod 323 is moved rearwardly carrying the spring beyond dead center and fulcruming the contact 48 into engagement with the fixed contact 47.

As shown clearly in the diagrams Figs. 19 and 20 of the drawings, the spring fingers 276 of sensing pins $a$, $b$, $c$, $d$ and $e$ are connected by leads $a'$, $b'$, $c'$, $d'$ and $e'$ with conductor bars $a^2$, $b^2$, $c^2$, $d^2$ and $e^2$, these bars being suitably spaced and insulated from each other and mounted upon a plate 335 of insulating material supported at the right rear of the carriage by clamps 336 which secure it to a rod 337 which latter extends from one end of the carriage frame to the other. Thus the conductor bars are positioned in vertical spaced alinement at the right end of the carriage and travel with the carriage in its step-by-step feed.

Mounted for engagement with these conductor bars throughout a certain period of carriage travel are five spring-contacts $a^3$, $b^3$, $c^3$, $d^3$ and $e^3$ which are held by terminal screws 338 on a small plate 340 of insulating material which is secured by screws 341 to the upper part of a bracket 342 which is secured to the upwardly extending ear 62 of the main frame. The spring contacts are, therefore, held stationary and they are engaged by the conductor bars when the carriage is moved to the right extreme to be in a position for the commencement of a line of typing on any sheet suitably located in the supplemental frame as heretofore described. Each spring contact has a lead 343 extending from its terminal screw through a conduit 344 to individual contact pins 345 mounted in an insulation block 346 fixed to the main frame of the machine. A coupler 347 having resilient socket members 348, one for each of the contact pins 345, is adapted to be removably connected to the main frame and suitably located rotatively so as to engage the proper socket with each of the contact pins. Leads $a^4$, $b^4$, $c^4$, $d^4$ and $e^4$ extend from this connector to the relay box 75 and into the actuating windings of the relay-operating magnets as shown in Fig. 19 of the drawings.

Current flowing from the source of electrical energy passes through conductors 351 and 352, through a variable resistance 353, through a conductor 354 to which is connected one end of each of the actuating windings for the magnets 290, 292, 295, 300 and 305. The other ends of the actuating windings for each of the magnets connect through leads $a^4$, $b^4$, $c^4$, $d^4$ and $e^4$ with spring contacts $a^3$, $b^3$, $c^3$, $d^3$ and $e^3$ which engage conductor bars $a^2$, $b^2$, $c^2$, $d^2$ and $e^2$. The flexible spring conductors 276 are connected by means of the leads $a'$, $b'$, $c'$, $d'$ and $e'$. The springs 276 press against the ends of the sensing pins $a$, $b$, $c$, $d$ and $e$ to urge the points of these pins against conductor plate 274 when perforations in the paper sheet permit such engagement. From this plate the circuit is grounded by conductor 355. From ground the circuit is completed through a lead 356, the normally closed universal switch 313, lead 357, main switch 52, to the opposite side of the source of electrical energy. Therefore, when the main switch is closed and any two of the sensing pins $a$, $b$, $c$, $d$ and $e$ are engaged with contact plate 274, a circuit is completed through the actuating windings of two of the relay magnets. If, for example, a combination of perforations has been made in the paper sheet simultaneously with the typing of the numeral 1, the relation of the perforations of the combination is shown in Fig. 19 at the bottom of the sheet by the shaded circles in the panel above the numeral 1. When the sheet is in proper position it will present these perforations opposite the sensing pins $a$ and $b$ and the circuit will be completed through conductors 351 and 352, resistance 353, actuating windings of magnets 290 and 292, in parallel, leads $a^4$ and $b^4$, spring contacts $a^3$ and $b^3$, conductor bars $a^2$ and $b^2$, leads $a'$ and $b'$ to the spring conductor fingers 276 which bear on the ends of sensing pins $a$ and $b$. These sensing pins now being in contact with the plate 274 current passes through conductor 355 to ground and thence through lead 356, universal switch 313, lead 357, main switch 52 to the opposite side of the source. This closure of the main switch under such conditions causes energization of magnets 290 and 292 closing the two relays of magnet 292 and the single relay of magnet 290. This establishes another circuit as follows: from the source through a lead 358 to variable resistance 360, through a lead 361, through closed relay 291, to a conductor 362, through closed relay 293, to a conductor 363 which goes to the actuating winding of the magnet connected with numeral 1 type bar. From the opposite end of this actuating winding the circuit continues through conductors 364 and 365 to ground and from ground through the universal switch 313, lead 357, main switch 52 to the opposite side of the source of current. Thus, by the energization of relay magnets 290 and 292 the actuating winding of the magnet 40 of number 1 type bar is energized, and when energized its armature 311 is moved forwardly, carrying forward the connecting rod 312 connected to one arm of the bell crank intermediate lever 204 which throws this arm substantially into the dot-and-dash position shown in Fig. 15 of the drawings and throws up the numeral type bar to printing position as shown by the dot-and-dash position of the type bar in that figure. As the type bar moves rapidly to printing position, the heel 218 engages the universal bar 50 which in turn rocks the escapement rocker frame 51 entering the rigid dog 220 to the carriage-escapement wheel 222 and simultaneously, as heretofore described, opening the contacts 47—48 of the universal switch. The result of this is the opening of the circuits through both the relay magnets and the type bar actuating magnet, and after typing of the numeral by the momentum acquired by the type bar, the latter returns to its basket position under the influence of return spring 203 and the escapement rocker frame is returned to its original position by spring 227. This return movement of the escapement rocker frame and universal bar re-establishes the engagement of the contacts 47 and 48 of the universal switch 313 and also disengages the rigid dog of the escapement mechanism allowing one step of carriage feed under control of the pivoted dog of that mechanism. This movement of the carriage presents another combination of perforations to the sensing pin group. The combination may be the same as before, in which case the same type bar will be actuated, or it may be a different combination representative of the numeral 4, for example, which will cause sensing pins $c$ and $d$ to engage with the plate 274 energizing relay magnets 295 and 300 and closing the seven different relay sets operated by these magnets. It will be apparent from the diagram Fig. 19 how the closing of these relay sets will complete the circuit through the actuating winding of the type-bar-actuating magnet for the numeral 4 type bar.

Decimal spacing

Obviously, if in the step movement of the carriage a new combination of perforations is not presented to the group of sensing pins the relay magnets will not be operated and no magnetic throw of the type bar will be achieved. To provide for this in the case of ordinary decimal spacing employed in writing a series of figures representing dollars and cents, the magnet 46 is employed. The armature 326 of this magnet has an extension 325 which has been referred to previously in connection with its supporting function for the rod 323 which operates the movable contact of the universal switch 313.

As shown in Fig. 18 of the drawings, the armature extension 325 supports the rear end of rod 323 between a collar 317 and a washer 379 suitably spaced therefrom to permit movement of the rod forwardly when the universal bar is actuated and thus permit opening of the universal switch. In this operation there is no movement of the armature 326, the rear end of the rod merely sliding through the armature extension. However, it will be seen that when the magnet 46 is energized and its armature moved, the extension of the armature will pick up the collar 317 on rod 323 and move the rod forwardly. This rocks the arm 328 clockwise, as viewed in Fig. 18, which rocks arm 331 in a corresponding direction, moving arm 334 of the escapement rocker frame in a counter-clockwise direction, thus moving the universal bar in the same direction that it is moved when engaged by the heel of any type bar. In other words, actuation of the magnet 46 enters the rigid dog 220 into engagement with a tooth of the escapement wheel and releases the pivoted dog 223 just as these operations are effected in any type-bar action. De-energization of the magnet releases the armature to the action of its conventional spring return and the spring 227 of the escapement mechanism restores the escapement mechanism to its normal position. Thus a single step of carriage feed is permitted under the influence of the carriage motor which presents the next combination of perforations to the group of sensing pins.

To actuate the winding of magnet 46 as such actuation may be required in ordinary decimal spacing operations, a plate 371 is secured to the rear of the carriage and this plate is provided with spaced cams 372, the spacing being in definite relation to the carriage-feed step movement and to the distance between decimals in a series of typed numerals. On the bracket 342, fixed to the rear of main frame, an insulation block 373 is adjustably secured by screws 374 the shanks of which project through a slot 375 in the bracket. This block carries a spring piece 376 of electrical conductivity, fixed to the block at one end by a terminal screw 377 and having a free end with a contact 378 adapted to be pressed into engagement with a contact 380 on a metal angle member 381 secured to the block by screw 382. The spring piece is formed with a pointed projection 383 about midway of its length, and this projection is adapted to be periodically engaged by the cams 372 in the usual course of carriage travel. If any of the cams 372 engages the projection 383, contacts 378 and 380 are periodically closed. The adjustment of the block is such that when decimal spacing in the original typing operation has provided a space between perforation combinations the projection 383 is engaged by one of the cams as the carriage is released by its escapement to make one step of feed. During the step feed the engagement is completed, the particular cam forces the spring piece 376 downwardly and effects the engagement of the contacts. Thus the regular escapement step of feed is supplemented by an additional step which moves the sheet with the carriage to pass the unperforated area of the sheet beyond the sensing pins and present the next combination of perforations in matched position with the points of said pins.

The foregoing description of one preferred specific embodiment of the invention is demonstrative of the application of the particular system of control for the reproduction of characters by a typing unit in which the types are selectively operable to printing position in the fashion of an ordinary correspondence typewriter or a bookkeeping machine of the well-known Underwood-Hanson construction. The invention in its broader aspects may be applied to any of a wide variety of business machines and the particular idea of a system of five control relays in electrical circuits under control of combinations of two out of five sensing elements may be readily incorporated in other machines where several digits of a series are simultaneously printed as, for example, in a Sundstrand machine.

The group of five perforating pins, according to the present invention, may be organized in an area equivalent substantially to the area within which, ordinarily, a single type impression is made. The number of pins permits the selection of varied combinations of two pins which provides the necessary ten different combinations. If the sensing devices fail to register with both perforations of the particular combination only one of the relay magnets will operate which is insufficient in the special circuit employed to energize any type-bar-actuating magnet. Thus the machine is stopped and the remedy may be applied.

It will be apparent that the extremely compact perforating or sensing groups of this invention, controlled by the special relay circuits disclosed, may be employed with or without a step-by-step carriage feed and with or without successively operable types.

What is claimed is:

1. In a business machine, in combination, a movable carriage adapted to receive and hold a work sheet, manually selectively operable types to produce type impressions on the sheet, means operable in accordance with movement of certain of the types to produce on the sheet codal representations characteristic of the particular types moved, and means controlled by the codal representations on the sheet for actuating said types to reproduce at a different place on said sheet a series of type impressions originally produced thereon under manual selection.

2. In a business machine, in combination, a movable carriage adapted to receive and hold a work sheet, selectively operable types, character-making devices operable in accordance with movement of certain of the types to produce characters in succession on said sheet characteristic of the particular types moved, means for relocating the work sheet on said carriage, and power means including a series of electrically responsive devices controlled by the sheet characters for actuating the types selectively and successively to produce automatically on said sheet a series of typing characters.

3. In a business machine, in combination, a frame, an escapement-controlled carriage movable thereon and adapted to receive and hold a work sheet, selectively operable types movable to a common typing point relative to said frame, means for locating a work sheet on said carriage to be typed upon by said types, and means, operable when certain of the types are operated to type on said sheet, to perforate characters on the sheet for subsequent sensing by an electrical device, an electrical sensing device operable during the escapement-controlled movement of the carriage to sense successive perforated characters on said work sheet, and means controlled by said sensing device for operating corresponding types.

4. In a business machine, in combination, a frame, an escapement-controlled carriage movable thereon and adapted to receive and hold a work sheet, selectively operable types movable to a common typing point relative to said frame, means for locating a work sheet on said carriage to be typed upon by said types, and means, operable when certain of the types are operated to typing position, to make codal representations on the work sheet for subsequent sensing by an electrical device, an electrical sensing device operable during the escapement-controlled movement of the carriage to sense successive codal representations on said work sheet, means controlled by said sensing device for operating corresponding types, manually operable means for instituting a character spacing movement of said carriage without operation of any type, and means for reproducing said spacing movement when the sensing device is carrying out its operation.

5. In a business machine, in combination, a frame, a carriage movable thereon, means for punching a work sheet, means for locating the sheet on the carriage by the sheet punching, selectively operable types movable to typing position on said sheet, means for making codal representations operable in distinctive combinations to characterize typing by particular types, an electrical sensing device, operable when the sheet has been relocated by its punching, to sense successive codal combinations, and means controlled by said sensing device for causing a reproduction at another part of the sheet of previously typed characters.

6. In a business machine, in combination, a frame, a carriage movable thereon, means for punching a sheet-locating hole in a work sheet, means controlled by the hole in the work sheet for locating the sheet on the carriage, means selectively operable to type characters on the work sheet and to perforate the work sheet successively in distinctive combinations to characterize typing by particular types, an electrical sensing device, operable when the sheet has been relocated by its hole, to sense said successive perforated combinations, means controlled by said sensing device for causing a reproduction by said distinctive combinations at another part of the sheet of previously typed characters.

7. In a business machine, in combination, a carriage, means for locating a work sheet thereon, selectively operable types movable to a common typing point, means for moving the carriage past the common typing point, sheet perforating means mounted to move with the carriage over a part of its travel to present the perforating means in a predetermined relation to the typing point, and means for maintaining such predetermined relation during subsequent travel of the carriage and a plurality of type actuations.

8. In a business machine, in combination, a carriage, means for locating a work sheet thereon, selectively operable type movable to a common typing point, means for moving the carriage past the common typing point, sheet perforating means and sensing means mounted to move with the carriage over a part of its travel to present the perforating and sensing means in a predetermined relation to the typing point, and means for maintaining such predetermined relation during subsequent travel of the carriage and a plurality of type actuations.

9. In a business machine, a frame, selectively operable types thereon movable to a common typing point, a motor-driven escapement-controlled carriage on said frame having means for receiving and locating a work sheet, a roller platen on said carriage, a group of sheet-perforating pins mounted on a plate on said carriage which plate has a limited capacity for slidable movement, a stop for holding said plate at the typing point as the carriage continues movement under control of its escapement, and means operable with certain of the types for actuating different combinations of the perforating pins as different types are moved to the typing point.

10. In a typewriter having selectively operable different types, keys for selecting the respective types and a step feeding carriage upon which a work sheet may be located for movement in a line past a common printing point for the types, the combination of combinational hole perforating means operable under control of said keys as the carriage moves in its step feed to perforate the sheet successively and variably in accordance with different types and keys, sensing means for the perforations, means to present the perforations in position to be successively engaged by the sensing means as the carriage steps from one position to another, and means for actuating said types successively as the perforations are sensed to thereby produce on the perforated sheet a series of typed characters representative of the successive perforations.

11. In a business machine, in combination, selectively operable different types movable to a common printing point, feeding means for step-by-step feed of the work-sheet relatively to the printing point, means for setting up on the work sheet, in correspondence to the different types, variable sensible characters, means for relocating the work sheet in the machine for the sensing of one of said characters, and means, including said step-by-step feeding means, for automatically successively sensing said one character and the other characters and successively actuating types identified by the characters until the variable characters set up on the work sheet have been typed in a series on the sheet.

12. In a business machine, in combination, a frame, a carriage movable thereon, means for punching a sheet-locating hole in a work sheet, means controlled by the hole in the work sheet for locating the sheet on the carriage, means selectively operable to type characters on the work sheet and to perforate the work sheet successively in distinctive combinations to characterize typing by particular types, an electrical sensing device, operable when the sheet has been relocated by its hole, to sense said successive perforated combinations, means controlled by said sensing device for causing a reproduction by said distinctive combinations at another part of the sheet of previously typed characters, and a decimal spacing device automatically operative to cause relative movement between the carriage and sensing device.

13. In a business machine; the combination of a complement of selectively operable types, a step-by-step feeding member cooperative with said types consonantly with imprinting the types one at a time upon a work sheet in said machine, a plurality of markers less in number than said types, certain of said markers being operable in correspondence to each type to produce codal representations of the typed characters upon the work sheet, a plurality of sensing elements in said machine to subsequently sense said representations, power operable actuators, one actuator for each type, and analyzing means controlling said actuators and responsive to said sensing elements to translate each representation into operation of a corresponding type actuator to type upon said work sheet.

14. In a business machine; the combination of typing members and a letter-feed carriage cooperative therewith for typing an item one character at a time at one or another field on a work sheet mounted on said carriage, means, operable in coordination with the movements of said typing members and carriage in typing an item at a given field of said work sheet, for producing on said work sheet a sensible codal representation for each character typed, means being provided to determine that said representation-producing means are operative only at said given field, a sensing device operative in coordination with the letter-feed-traverse of said carriage while another field of said work sheet is presented to the typing members to sense said codal representations character-by-character, and means responsive to the character-by-character operation of said sensing device to actuate corresponding typing members to retype at said other field the item first typed at said given field.

15. In a business machine; the combination with a record-sensing device adapted to control an electric circuit, an escapement member, and a carriage movable a step at a time, at two opposite movements of said member, to effect relative movements between the record and sensing device, said record bearing recordings that are sensable one at a time by said sensing device in the intervals between carriage steps, of a switch in said circuit, and means controlled by said escapement member through its opposite movements for opening and reclosing said switch automatically in substantial correspondence with the initiation and end of each carriage step so that said circuit may be subject to the sensing device only during said intervals.

16. In a business machine having types and means for perforating a sheet with distinctive characters corresponding to particular types, and having sensing elements adapted to enter said perforations and control machine operations; a motor-driven step-by-step movable carriage having means for locating and holding the sheet and slidably mounting the sensing elements, and means for holding the sensing elements stationary for traverse thereof by the sheet as the carriage moves step-by-step through a predetermined zone of its travel.

17. In a business machine; selectively operable types movable to and from a common typing point, a motor-driven escapement-controlled carriage cooperative with said types for effecting relative movement between a work sheet and the typing point; and means for automatically picking up a previously typed series of figures appearing on the sheet, comprising sheet-perforating devices operable conjointly with the previous typing of the figures and between escapement-controlled steps of the carriage to make a succession of recordings representing said figures, perforation-reading elements subsequently operable between steps of the carriage to read the recordings in succession, electrical relays controlled by the reading elements, and actuating windings controlled by the relays to effect machine operations in accordance with said recordings.

18. In a business machine; selectively operable figure-types, a motor-driven escapement-controlled carriage cooperative with said types for typing in succession a series of figures on a work sheet, means for perforating the said work sheet with characters symbolic of the individual figures at the time such series is typed, sensing means between which and the sheet a relative traverse is effected by means of said carriage, means for relocating the sheet in the machine with the sensing means opposite the perforations symbolic of the first figure, and means controlled by said sensing means to effect operations of the machine in accordance with said perforations.

19. In a business machine; ten different numeral agents and ten actuating windings for instituting movements thereof; a number, less than ten, of relays actuatable combinatively for selectively energizing each of said actuating windings; a group of record-sensing devices, one for each relay, for the control of said relays; a similar group of members for making sensable characters on said record in accordance with operation of said agents to be sensed by said sensing devices; electrical circuits controlled by said sensing devices and including said relays and actuating windings, and a motor-driven escapement-controlled carriage cooperative with said agents for effecting a step-by-step movement of a record relatively to the groups of sensing devices and character-making members.

20. In a business machine, in combination, a carriage; means to step-feed the carriage to effect relative movements of a work sheet and a printing point; a plurality of different types; means, including keys, for causing movement of said types selectively to the printing point; character-forming devices; means in said machine for moving said devices to set up on said work sheet sensable characters corresponding to the types respectively, as the keys are operated and the carriage is stepped to move the work sheet relatively to the printing point; and means for sensing the set-up characters on said sheet and automatically effecting operations in accordance with the sensed characters as the carriage is stepped to move the work sheet relatively to the printing point.

21. In a business machine, in combination, a carriage adapted to receive a work-sheet, selectively operable types for typing on the carriage-received sheet, means to move the carriage a step for each operation of a type, means for effecting perforations in said carriage-received sheet characteristic of the different types respectively, and means for sensing said perforations in the carriage-received sheet and causing automatic successive operations in conformity with the perforation-characteristics.

22. In a business machine having a traveling carriage for effecting relative letter-step movement of a work sheet and a typing point, and a plurality of type-actuation-controlling elements for causing selective and successive operation of the same or different types at such typing point; means for setting up on the said work sheet, by operation of said elements, a series of sensable characters, and means for sensing said characters and for producing on the said work sheet a typing of the first character of the series and automatically advancing the carriage in step fashion and automatically producing on said sheet typing of the rest of the series of characters by successive operations.

23. In a business machine, in combination, a plurality of selectively operable numeral agents, a carriage having a step-by-step movement as the agents are operated, means for locating a sheet relatively to the carriage, means for making codal representations on said sheet characteristic of said agents and in consequence of the operation of said agents and carriage, means for analyzing said codal representations and causing operation of the agents successively as the carriage moves step-by-step, and types cooperable with said agents to type on the sheet in conformity with said representations.

24. In a business machine, in combination, a frame, an escapement-controlled carriage movable thereon and adapted to receive and hold a work sheet, selectively operable types movable to a common typing point, means for locating a work sheet on said carriage to be typed upon by said types, and means operable, when certain of the types are operated to type on said sheet, to make characters on the sheet for subsequent sensing by a sensing device, a sensing device operable during the escapement-controlled movement of the carriage to sense successive characters on said work sheet, and means controlled by said sensing device for effecting operations in accordance with said characters.

25. In a business machine, in combination, a frame, a carriage movable thereon, means for marking a work sheet, means for locating the sheet on the carriage by the sheet marking, selectively operable types movable to typing position on said sheet, means for step-feeding the carriage at each operation of a type, means for making codal representations on the sheet to characterize typing by particular types, a sensing device operable when the sheet has been relocated by its marking, to sense successive codal representations, and means controlled by said sensing device for causing operations in accordance with the sensed representations.

26. In a business machine having work-sheet-holding means, selectively operable types movable to a common point to type upon a work-sheet held by said holding means, and means for causing a relative step-by-step feed of the work-sheet and the types; the combination of means for making code characters successively on said work-sheet representative of certain of said types, means for reading the code characters, and means for causing successive distinctive operations of the machine in response to said reading.

27. In a business machine having work-sheet-holding means, selectively operable types movable to a common point to type upon a work-sheet held by said holding means, and means for causing a relative step-by-step feed of the work-sheet, held by said holding means, and the types; the combination of means for making code characters successively on said work-sheet representative of certain of said types, means for aligning said work-sheet for the reading of the characters one-by-one during the feed of the work-sheet, means for reading the code characters, and means for causing successive distinctive operations of the machine in response to said reading.

28. In a business machine having work-sheet-holding means, selectively operable types movable to a common point to type upon a work-sheet held by said holding means, and means for causing a relative step-by-step feed of the work-sheet and the types; the combination of means for making code characters successively on the work-sheet representative of certain of said types as said types are successively selectively operated to type on the work-sheet, means for reading the code characters, and means for causing successive distinctive operations of the machine in response to said reading.

29. In a business machine having work-sheet-holding means, selectively operable types movable to a common point to type upon a work-sheet held by said holding means, and means for causing a relative step-by-step feed of the work-sheet and the types; the combination of means for perforating code characters successively on the work-sheet representative of certain of said types as said types are successively selectively operated to make a line of typing on the work-sheet, means for reading the code characters successively during a portion of the operation of said feed means, and means for operating the types in response to the reading and in accordance with the perforated code characters.

30. In a business machine having work-sheet-holding means, selectively operable types movable to a common point to type upon a work-sheet held by said holding means, and means for causing a relative step-by-step feed of the work-sheet and the types; the combination of means for perforating code characters successively on the work-sheet representative of certain of said types as said types are successively selectively operated to make a line of typing on the work-sheet, means for facilitating the alignment of the perforated code characters with reading means, means for reading the code characters successively during a portion of the operation of said feed means, and means for operating the types in response to the reading and in accordance with the perforated code characters.

31. A business machine including, in combination, selectively operable numeral agents, a member movable a step at each operation of an agent, character-making mechanism cooperable with said agents and member to make sensable characters, one at a time, on a work sheet in the machine to represent the individual numbers of the balance of an account, means operable subsequently to sense the characters on the sheet, one at a time depending on step movements of said member, means responsive to the operation of the sensing means to operate the numeral agents with attendant effectuation of said step movements of said member, and numeral types cooperable with said agents to type the balance at least once on the sheet, number by number.

32. A business machine including, in combination, a traveling work-sheet carriage, a structure, including character-making elements and character-sensing elements for operating upon the work sheet, means tending to move said structure with the carriage but permitting arrest of said structure while the carriage and sheet alone move relatively to said elements for operating upon said sheet character-by-character, and means for so arresting said structure during a predetermined part of the carriage travel.

33. A business machine including, in combination, a traveling work-sheet carriage, a structure, including character-making elements and character-sensing elements for operating upon the work sheet, means tending to move said structure with the carriage but permitting arrest of said structure while the carriage and sheet alone move relatively to said elements for operating upon said sheet character-by-character, and means for so arresting said structure while the carriage moves through a predetermined character-making zone and through a predetermined character-sensing zone of its travel.

34. A business machine including, in combination, a traveling work-sheet carriage, line-spacing mechanism, a structure including a group of character-making elements and a group of character-sensing elements, the groups being disposed a line space distance apart on said structure, means tending to move said structure with the carriage but permitting arrest of said structure while the carriage and sheet alone move relatively to said elements for operating upon said sheet character-by-character, and means for so arresting said structure during a predetermined part of the carriage travel.

35. A business machine including, in combination, a traveling work-sheet carriage, a structure, including character-making elements and character-sensing elements for operating upon the work sheet, means tending to move said structure with the carriage but permitting arrest of said structure while the carriage and sheet alone move relatively to said elements for operating upon said sheet character-by-character, a retractable stop for arresting said structure during a predetermined zone of the carriage travel, means automatically effecting retraction of said stop at the end of said zone of carriage travel so that the carriage and structure may move beyond said zone toward another zone, and a stop for arresting said structure while the carriage traverses said other zone.

RICHARD W. PITMAN.